US012663846B2

(12) United States Patent
Cong et al.

(10) Patent No.: US 12,663,846 B2
(45) Date of Patent: Jun. 23, 2026

(54) METHOD AND SYSTEM FOR IMPROVING PEAK PERFORMANCE OF PROCESSOR

(71) Applicant: Delta Electronics (Shanghai) Co., Ltd., Shanghai (CN)

(72) Inventors: Wulong Cong, Shanghai (CN); Min Zhou, Shanghai (CN); Jinping Zhou, Shanghai (CN); Ziying Zhou, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 89 days.

(21) Appl. No.: 18/834,234

(22) PCT Filed: Jan. 19, 2023

(86) PCT No.: PCT/CN2023/073020
§ 371 (c)(1),
(2) Date: Jul. 30, 2024

(87) PCT Pub. No.: WO2023/143333
PCT Pub. Date: Aug. 3, 2023

(65) Prior Publication Data
US 2025/0199593 A1 Jun. 19, 2025

(30) Foreign Application Priority Data

Jan. 30, 2022 (CN) .......................... 202210114440.4
Dec. 8, 2022 (CN) .......................... 202211570709.6

(51) Int. Cl.
*G06F 1/00* (2006.01)
*G06F 1/26* (2006.01)
(Continued)

(52) U.S. Cl.
CPC .............. *G06F 1/26* (2013.01); *G06F 1/3203* (2013.01); *H02M 3/01* (2021.05); *H02M 3/158* (2013.01); *H02M 3/33576* (2013.01)

(58) Field of Classification Search
CPC .......... G06F 1/26; G06F 1/324; G06F 1/3296; G06F 1/3203; G06F 1/32; G06F 9/5027;
(Continued)

(56) References Cited

U.S. PATENT DOCUMENTS 5,370,645 A * 12/1994 Klicek ............... A61B 18/1206
606/34
6,928,560 B1 * 8/2005 Fell, III .................... G06F 1/28
713/340
(Continued)

FOREIGN PATENT DOCUMENTS

CN 1097763 C 1/2003
CN 102483646 A 5/2012
(Continued)

*Primary Examiner* — Volvick Derose
(74) *Attorney, Agent, or Firm* — CKC & Partners Co., LLC

(57) ABSTRACT

The present invention proposes a method for improving a peak performance of a processor and a system for improving a peak performance of a processor. The system includes a load, including a processor; and a power supply device, used for receiving an input voltage and generating an output voltage, and supplying power to the load by the output voltage, wherein the load has a load impedance, and the power supply device has a characteristic impedance; the load impedance is defined by the output voltage of the power supply device and the maximum step current provided by the power supply device, and the characteristic impedance is defined by the equivalent inductance of the power supply device and the output side equivalent capacitance; the ratio of the characteristic impedance to the load impedance is less (Continued)

than 1. This system may improve the peak performance of the processor at a low impedance ratio.

26 Claims, 15 Drawing Sheets

(51) Int. Cl.
| | |
|---|---|
| *G06F 1/3203* | (2019.01) |
| *H02M 3/00* | (2006.01) |
| *H02M 3/158* | (2006.01) |
| *H02M 3/335* | (2006.01) |

(58) Field of Classification Search
CPC .... H02M 3/01; H02M 3/158; H02M 3/33576; Y02D 10/00
USPC ........................................................ 713/300
See application file for complete search history.

(56) References Cited

U.S. PATENT DOCUMENTS

| | | | | |
|---|---|---|---|---|
| 7,519,843 | B1 * | 4/2009 | Buterbaugh | .......... G06F 1/3203 |
| | | | | 713/340 |
| 2010/0083009 | A1 * | 4/2010 | Rotem | .................. G06F 1/3203 |
| | | | | 713/300 |
| 2011/0154066 | A1 * | 6/2011 | Ravichandran | ....... G06F 1/3296 |
| | | | | 713/300 |
| 2013/0111225 | A1 * | 5/2013 | Humphrey | ................ G06F 1/26 |
| | | | | 713/300 |
| 2014/0108846 | A1 * | 4/2014 | Berke | ..................... G06F 1/263 |
| | | | | 713/340 |
| 2015/0046733 | A1 * | 2/2015 | Lin | ............................ G06F 1/26 |
| | | | | 713/323 |
| 2015/0062108 | A1 * | 3/2015 | Archibald | ................. G06F 1/26 |
| | | | | 345/212 |
| 2017/0031431 | A1 * | 2/2017 | Khatri | ................... G06F 1/3246 |
| 2019/0089336 | A1 * | 3/2019 | Hau | ........................ H02M 1/08 |
| 2019/0108977 | A1 * | 4/2019 | Wei | .................. H01J 37/32183 |
| 2019/0377405 | A1 * | 12/2019 | Uan-Zo-Li | ........... G06F 1/3296 |
| 2020/0211824 | A1 * | 7/2020 | Morii | ..................... H03H 7/383 |
| 2022/0091656 | A1 * | 3/2022 | Nge | .......................... G06F 1/26 |
| 2023/0229222 | A1 * | 7/2023 | Uan-Zo-Li | .............. G06F 1/305 |
| | | | | 713/300 |
| 2024/0168512 | A1 * | 5/2024 | Veerabathini | ............ G06F 1/04 |

FOREIGN PATENT DOCUMENTS

| | | |
|---|---|---|
| CN | 103069359 A | 4/2013 |
| CN | 104317379 A | 1/2015 |
| CN | 105634433 A | 6/2016 |
| CN | 106708231 A | 5/2017 |
| CN | 111208351 A | 5/2020 |
| CN | 113009999 A | 6/2021 |
| TW | 201735739 A | 10/2017 |

* cited by examiner

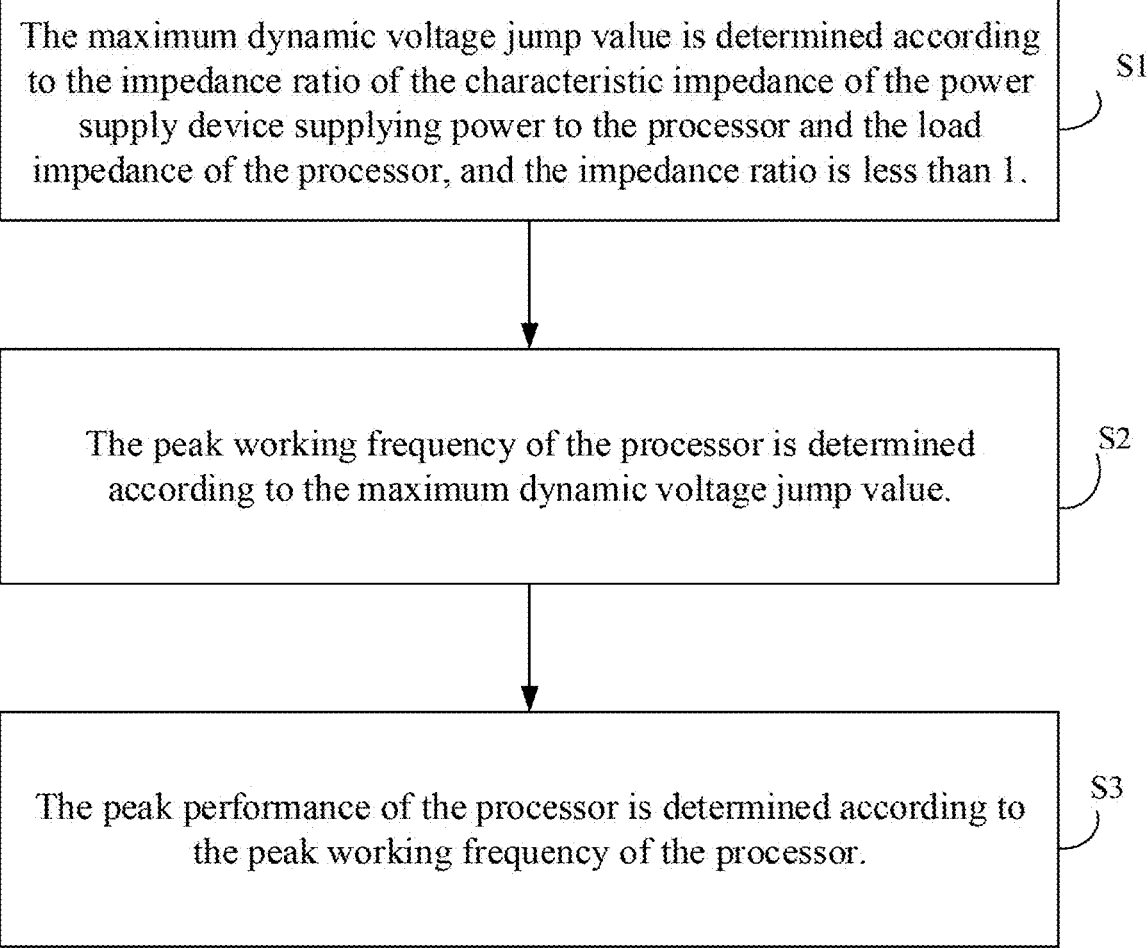

The maximum dynamic voltage jump value is determined according to the impedance ratio of the characteristic impedance of the power supply device supplying power to the processor and the load impedance of the processor, and the impedance ratio is less than 1.    S1

The peak working frequency of the processor is determined according to the maximum dynamic voltage jump value.    S2

The peak performance of the processor is determined according to the peak working frequency of the processor.    S3

Fig. 1

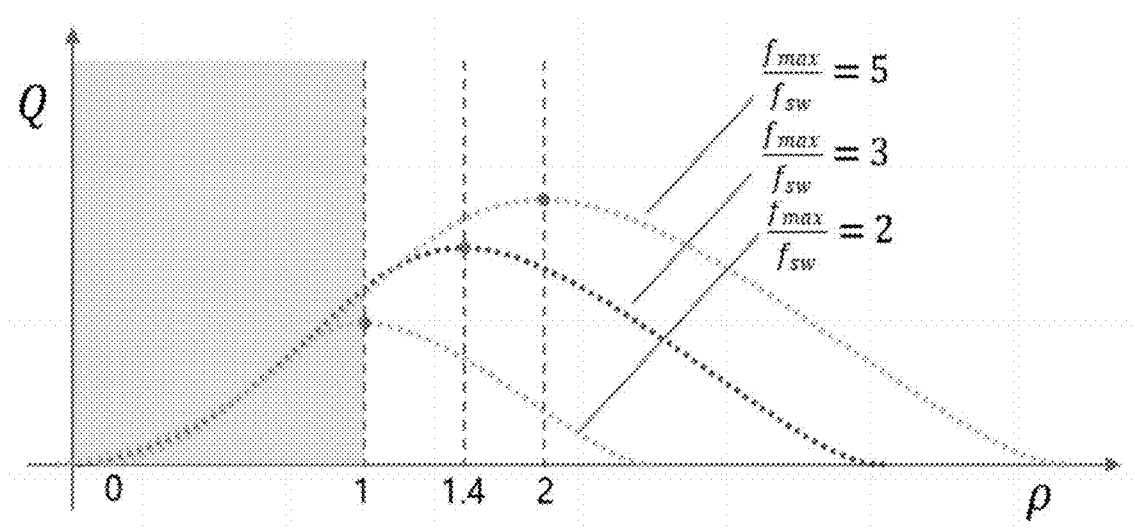
Fig. 10
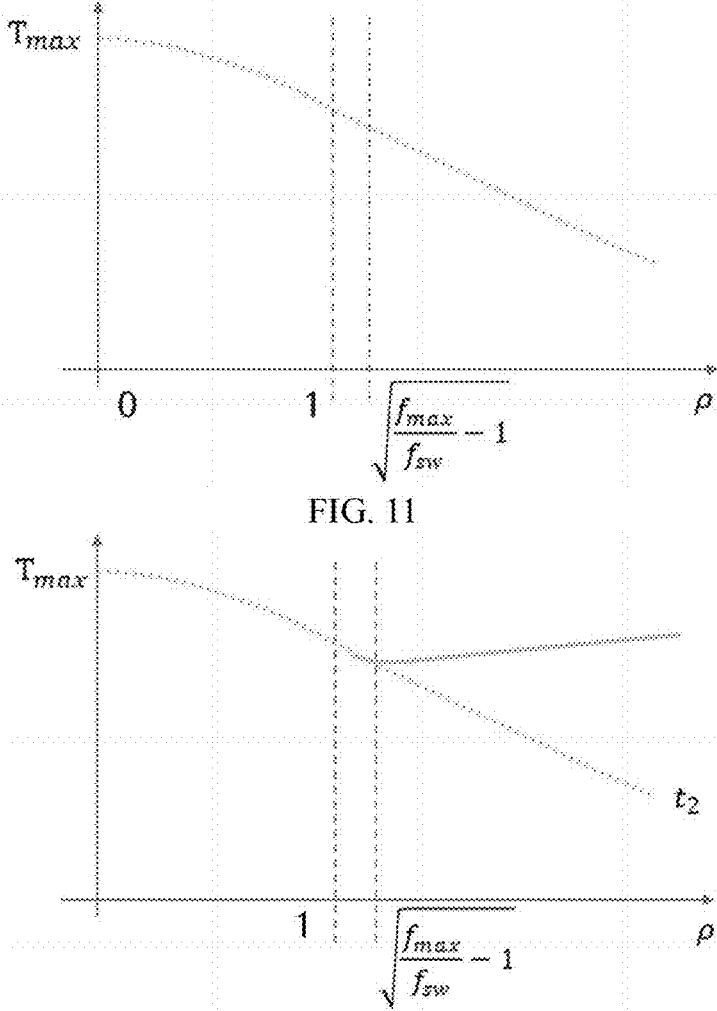
FIG. 11
Fig. 12

METHOD AND SYSTEM FOR IMPROVING PEAK PERFORMANCE OF PROCESSOR

CROSS-REFERENCE TO RELATED APPLICATIONS

This non-provisional application claims priority under 35 U.S.C. § 119(a) on Patent Applications No. 202210114440.4 filed on Jan. 30, 2022, in P.R. China, and No. 202211570709.6 filed on Dec. 8, 2022, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The application relates to the technical field of power supply system, and particularly to method and system for improving peak performance of processor.

BACKGROUND

With the rapid development of mobile Internet, big data and artificial intelligence, more and more data need to be processed, analyzed and computed, and the performance of processor chips is required to be higher and higher. The performance T represents the number of times the chip can compute a type of data in one time unit. Generally, the number of floating point operations performed per second is used as the evaluation standard for performance. Assuming a processor includes multiple cores with the same working frequency, the performance T of the processor chip can be expressed as:

$$T = f \cdot N_{cuda} \cdot N_{ops}$$

where, $N_{cuda}$ is the number of cores of the processor chip; f is the working frequency of the core; $N_{ops}$ is the number of floating point operations that can be performed per clock cycle of each core.

Furthermore, the peak performance $T_{max}$ of the processor chip represents the maximum number of times that the chip can compute a type of data in a time unit, which can be expressed as:

$$T_{max} = f_{cmax} \cdot N_{cuda} \cdot N_{ops}$$

where, $f_{cmax}$ is the highest working frequency of the core, that is, the peak working frequency of the processor chip.

The greater the peak performance, the stronger the capability of the processor chip to process data. In order to improve the peak performance of the processor chip, the number of processor chip cores, the peak working frequency of the processor chip, or the number of floating point operations per clock cycle of each core can be increased. The number of floating point operations per clock cycle of each core is related to the chip architecture, which is relatively fixed in general. Therefore, it is more likely to increase the peak performance of the processor chip by increasing the number of cores or increasing the peak working frequency of the processor chip.

In the power supply system, the processor chip, as a load, receives the energy provided by the power supply, performs data processing with this energy, and finally converts the received energy into heat. The maximum heat that the processor can dissipate is the TDP (thermal design power) of the processor, which is positively related to the number of its cores and its working frequency. In addition, before the energy is transferred to the processor chip, it must first pass through the power supply. Energy loss will inevitably occur on the power supply, and the lost energy will also be dissipated in the form of heat, which further brings the pressure of system heat dissipation. As the processor chip and power supply are placed close to each other, they generally share a heatsink. Therefore, the TDP of the processor chip will be limited by the efficiency of the power supply on the premise of a certain heat dissipation capability of the heatsink. Assuming the power converting efficiency of the power supply is q, the power loss of the power supply is $$\frac{TDP}{\eta} - TDP.$$

The sum of the loss of the chip and the power supply should not exceed the maximum heat dissipation power $P_{max}$ of the heatsink. Therefore, $$TDP + \left( \frac{TDP}{\eta} - TDP \right) = \frac{TDP}{\eta} \le P_{max}$$

Namely, $$TDP \le P_{max} \cdot \eta$$

From the above expression, we can see that the design of the TDP of the processor chip will be affected by the efficiency of the power supply. Under the same maximum heat dissipation power $P_{max}$, the higher the efficiency of the power supply device, the higher the TDP of the processor chip.

Therefore, the prior art usually improves the efficiency of the power supply to improve the TDP of the processor chip, thereby improving the peak performance of the processor chip. However, nowadays, the efficiency of power supply is already very high, and it is difficult to improve the efficiency of the power supply to a higher level. Otherwise, additional problems, such as higher cost, larger size, slow response, may occur.

In addition, the dynamic performance of the power supply is also an indicator to be considered in power supply design in the prior art. The dynamic performance of the power supply refers to the drop or rise value of the working voltage supplied by the power supply to the load, and how long it returns to the steady-state value when the load switches between different loads, such as light load and heavy load. For example, when the load is a processor chip, the light load usually means that the performance of the processor chip is 0%-30% of its peak performance, while the heavy load means that the performance of the processor chip is more than 70% of its peak performance. In the prior art, the dynamic performance indicators are set mainly to ensure that the load can work safely and normally. Therefore, in order to improve the peak performance of the chip, the efficiency of the power supply is the main design consideration, while the dynamic performance of the power supply only needs to ensure that the working voltage of the chip is not lower than the minimum working voltage Vmin and not higher than the maximum working voltage $V_{max}$ when the load changes.

SUMMARY

Under such background, one aspect of the disclosure is to provide a method and a system for improving peak performance of processor. The present invention can greatly improve the peak performance of a processor chip by improving the dynamic performance of the power supply device for the processor.

According to one aspect of the disclosure, a method for improving a peak performance of a processor is provided, the method including:

S1, the maximum dynamic working voltage change of the processor is determined according to the impedance ratio of the characteristic impedance of the power supply device supplying power to the processor to the load impedance of the processor, and the impedance ratio is less than 1; the maximum dynamic working voltage change of the processor is the maximum working voltage drop of the processor when the load rises and/or the maximum working voltage rise of the processor when the load falls;

S2, the peak working frequency of the processor is determined according to the maximum dynamic working voltage change of processor; and S3, the peak performance of the processor is determined according to the peak working frequency of the processor.

The characteristic impedance is determined according to the ratio of the equivalent inductance of the power supply device to the output side equivalent capacitance; and the load impedance is determined according to the ratio of the output voltage of the power supply device to the maximum step current provided by the power supply device.

The maximum working voltage drop of the processor when the load is switched from the lightest to the heaviest, and according to the impedance ratio, the maximum working voltage drop of the processor is satisfied:

$$v_{drop} = \frac{1}{2} \cdot \rho^2 \cdot \left(\frac{i_{upm}}{i_{max}}\right)^2 \cdot \frac{f_{sw}}{f_{max} - f_{sw}} \cdot V_{DD},$$

the maximum working voltage rise of the processor is the working voltage rise of the processor when the load is switched from the heaviest to the lightest, and according to the impedance ratio, the maximum working voltage rise of the processor is satisfied:

$$v_{rise} = \frac{1}{2} \cdot \rho^2 \left(\frac{i_{dom}}{i_{max}}\right)^2 \cdot V_{DD}$$

where, the impedance ratio is $$\rho = \frac{Z_c}{Z_0};$$

the characteristic impedance of the power supply device is $$Z_c = \sqrt{\frac{L_{eq}}{C_{eq}}};$$

the load impedance is $Z_o = v_o/i_{max}$; $L_{eq}$ is the equivalent inductance of the power supply device; $C_{eq}$ is the output side equivalent capacitance of the power supply device; $v_o$ is the output voltage of the power supply device; $i_{max}$ is the maximum step current provided by the power supply; $f_{sw}$ is the switching frequency of the power supply device; $f_{max}$ is the maximum frequency of the power supply device in the dynamic process; $i_{upm}$ is the step current when the load changes from the lightest to the heaviest; $i_{dom}$ is the step current when the load changes from the heaviest to the lightest.

Wherein, the step S2 further including:

the minimum working voltage is obtained according to the difference between the steady-state working voltage and the maximum working voltage drop of the processor;

the maximum working voltage is obtained according to the sum of the steady-state working voltage and the maximum working voltage rise of the processor; and the peak working frequency of the processor is the highest working frequency corresponding to the minimum working voltage within the voltage range from the minimum working voltage to the maximum working voltage.

The peak working frequency of the processor is satisfied:

$$f_{cmax} = k \cdot (v - V_{min}) + f_{cb}$$

where, v is the instantaneous working voltage of the processor; $V_{min}$ is the minimum working voltage of the processor; k is the proportionality coefficient; $f_{cb}$ is the maximum working frequency corresponding to the minimum working voltage of the processor.

The calculation formula for determining the peak performance of the processor according to the peak working frequency of the processor is satisfied:

$$T_{max} = f_{cmax} \cdot N_{cuda} \cdot N_{ops} = [k \cdot (v - V_{min}) + f_{cb}] \cdot N_{cuda} \cdot N_{ops}$$

where, $T_{max}$ is the peak performance of the processor; $N_{cuda}$ is the number of the processors; $N_{ops}$ is the number of floating point operations that can be performed per clock cycle of each core.

The calculation formula for determining the thermal design power of the processor according to the peak working frequency of the processor is satisfied:

$$TDP = C_e \cdot N_{cuda} \cdot [k \cdot (v - V_{min}) + f_{cb}] \cdot V_{DD}^2 + V_{DD} \cdot I_{leak}$$

where, $C_e$ is the equivalent capacitance of single core of the processor; $N_{cuda}$ is the number of cores; $I_{leak}$ is the leakage current of the processor.

The maximum dynamic working voltage change of the processor is the maximum working voltage drop of the processor.

The method further including:

the thermal design power of the processor is determined according to the peak working frequency and the steady-state working voltage of the processor.

The method further including:

if the thermal design power is not equal to a preset power threshold, the impedance ratio is correspondingly increased or decreased according to the comparison result, and the step S1 is skipped to; and if the thermal design power is equal to the preset power threshold, the step S3 is skipped to.

The method further including:

the thermal design power is compared with an initial power; if the thermal design power is not equal to the initial power, the steady-state working voltage is reduced and the step S1 is skipped to; and if the thermal design power is equal to the initial power, the step S3 is skipped to.

The maximum dynamic working voltage change of the processor is the maximum working voltage drop of the processor and the maximum working voltage rise of the processor.

Wherein the step S2 further including:

the steady-state working voltage of the processor is determined according to the maximum working voltage rise of the processor; and the peak working frequency of the processor is determined according to the steady-state working voltage and the maximum working voltage drop of the processor.

A system for improving a peak performance of a processor, the system including:

a load, including a processor; and a power supply device, used for receiving an input voltage and generating an output voltage, and supplying power to the load by the output voltage, wherein the load has a load impedance, and the power supply device has a characteristic impedance; the load impedance is defined by the output voltage of the power supply device and the maximum step current provided by the power supply device, and the characteristic impedance is defined by the equivalent inductance of the power supply device and the output side equivalent capacitance; the ratio of the characteristic impedance to the load impedance is less than 1.

The power supply device includes n first circuit units, n being a positive integer; each of the first circuit units includes an inductor; when n is greater than or equal to 2, the n first circuit units are connected in parallel; and the equivalent inductance of the power supply device and the inductance of the inductor are related to n, and the output side equivalent capacitance is related to the total output capacitance of the n first circuit units.

The n first circuit units directly supply power to the load, and the output side equivalent capacitance is equal to the total output capacitance of the n first circuit units.

The first circuit units are Buck circuits, and the n first circuit units have the same topology, and the equivalent inductance of the power supply device is expressed as:

$$L_{eq} = \frac{L + M * t}{n}$$

where, L is the inductance of the inductor; M is the mutual inductance between the inductors of the first circuit units; n is greater than or equal to 1; t is a constant;

where, when inductors are positively coupled with each other, M>0, t=1; when inductors are reversely coupled with each other, M<0, t=1; and when inductors are not coupled, t=0.

The first circuit units are Buck-Boost or Boost circuits, and the n first circuit units have the same topology, and the equivalent inductance of the power supply device is expressed as:

$$L_{eq} = \frac{L(1 - D) + M * t}{n}$$

where, L is the inductance of the inductor; M is the mutual inductance between the inductors of the first circuit units; D is the duty cycle of the switch in the first circuit unit; n is greater than or equal to 1; t is a constant;

where, when inductors are positively coupled with each other, M>0, t=1; when inductors are reversely coupled with each other, M<0, t=1; and when inductors are not coupled, t=0.

The power supply device further includes m second circuit units, where m is a positive integer; when m is greater than or equal to 2, the m second circuit units are connected in parallel; the output port of the first circuit unit is electrically coupled to the input port of the second circuit unit, and the output port of the second circuit unit is electrically coupled to the load; and the output side equivalent capacitance is determined by the total output capacitance of the n first circuit units and the total output capacitance of the m second circuit units.

The second circuit units are non-adjustable circuits, and the ratio of the input voltage to the output voltage of the second circuit unit is k; the output side equivalent capacitance is $$C_{eq} = C_o + C_1 k^2$$

where, $C_0$ is the total output capacitance of the m second circuit units, and $C_1$ is the total output capacitance of the n first circuit units.

The first circuit units are Buck circuits, and the n first circuit units have the same topology, and the equivalent inductance of the power supply device is equal to the inductance of the inductor; the equivalent inductance of the power supply device is expressed as:

$$L_{eq} = \frac{L + M * t}{n * k^2}$$

where, L is the inductance of the inductor; M is the mutual inductance between the inductors of every two first circuit units; n is greater than or equal to 1; t is a constant.

where, when inductors are positively coupled with each other, M>0, t=1; when inductors are reversely coupled with each other, M<0, t=1; and when inductors are not coupled, t=0.

The first circuit units are Buck-Boost or Boost circuits, and the n first circuit units have the same topology, and the equivalent inductance of the power supply device is expressed as:

$$L_{eq} = \frac{L(1 - D) + M * t}{n * k^2}$$

where, L is the inductance of the inductor; D is the duty cycle of the switch in the first circuit unit; M is the mutual inductance between the inductors of every two first circuit units; n is greater than or equal to 1; t is a constant.

where, when inductors are positively coupled with each other, M>0, t=1; when inductors are reversely coupled with each other, M<0, t=1; and when inductors are not coupled, t=0.

The second circuit units are adjustable circuits; the ratio of the characteristic impedance of the second circuit unit to the load impedance is less than 1, and the voltage gain of the first circuit unit is greater than or equal to 8.

The ratio of the characteristic impedance to the load impedance is $$p = \frac{Z_c}{Z_o},$$

the characteristic impedance is $$Z_c = \sqrt{\frac{L_{eq}}{C_{eq}}};$$

the load impedance is $Z_o = v_o / i_{max}$; $L_{eq}$ is the equivalent inductance of the power supply device; $C_{eq}$ is the output side equivalent capacitance of the power supply device; $v_o$ is the output voltage of the power supply device; $i_{max}$ is the maximum step current provided by the power supply.

A system for improving a peak performance of a processor, the system including:

a load, including a processor; and a power supply device, used for receiving an input voltage and generating an output voltage, and supplying power to the load by the output voltage, wherein the power supply device has a characteristic impedance, and the characteristic impedance is defined by the equivalent inductance of the power supply device and the output side equivalent capacitance; the load has a load impedance, and the load impedance is defined by the output voltage of the power supply device and the maximum step current of the power supply device; the power supply device includes a control circuit, and the control circuit is used for controlling the power supply device and adjusting the ratio of the characteristic impedance to the load impedance according to a comparison result of a signal reflecting the ratio of the characteristic impedance to the load impedance and a reference value.

The ratio is made to be less than 1 through adjusting the ratio of the characteristic impedance to the load impedance.

The above embodiments may provide a method and system for improving peak performance of processor, In the method for improving a peak performance of a processor provided by the present embodiment, the maximum dynamic working voltage change of the processor is determined according to the impedance ratio of the characteristic impedance of the power supply device supplying power to the processor to the load impedance of the processor, and the impedance ratio is less than 1; the peak working frequency of the processor is determined according to the maximum dynamic working voltage change of the processor; the peak performance of the processor is determined according to the peak working frequency of the processor. Compared with the prior art, the present invention improves the dynamic performance of the power supply device of the power supply system by setting the impedance ratio of the power supply device to be less than 1, thereby reducing the working voltage change of the processor, reducing the steady-state working voltage, keeping the thermal design power of the processor unchanged or slightly dropped, and improving the peak working frequency of the processor to improve the peak performance.

BRIEF DESCRIPTION OF THE DRAWINGS

FIG. 1-1 shows a specific flow diagram of step S2 in FIG. 1 (case 1);

FIG. 1-2 shows a specific flow diagram of step S2 in FIG. 1 (case 2);

FIG. 1-3 shows a specific flow diagram of step S2 in FIG. 1 (case 3);

FIG. 2 shows a dynamic circuit model of the processor chip;

FIG. 3 is a working state diagram during load increasing process;

FIG. 5-1 shows the relationship between the working voltage and the working frequency of the processor chip;

FIG. 5-2 shows the relationship between the working voltage and the working frequency of the processor chip (case 1);

FIG. 5-3 shows the relationship between the working voltage and the working frequency of the processor chip (case 2);

FIG. 5-4 shows the relationship between the working voltage and the working frequency of the processor chip (case 3);

FIG. 10 shows the relationship curve between fluctuation operand Q and impedance ratio ρ;

FIG. 11 shows the relationship curve between peak performance $T_{max}$ and impedance ratio ρ;

FIG. 12 is a comparison diagram of the relationship curve between the peak performance $T_{max}$ and the impedance ratio ρ obtained by the method for improving the peak performance of the chip in the present invention and the method for improving the peak performance in the prior art;

The attached figure is marked as:

Figure 1:
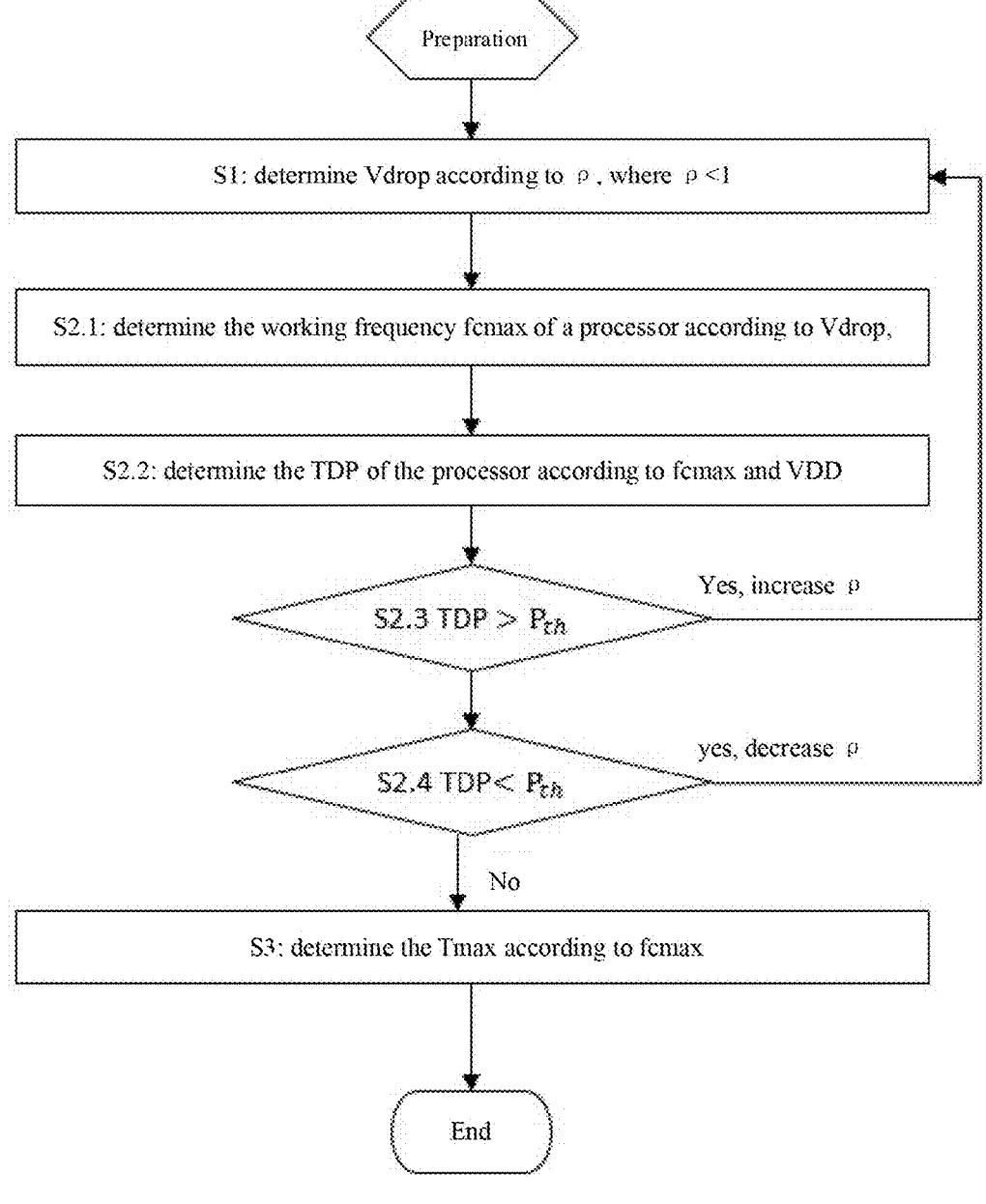
FIG. 1 is a flow diagram of the method for improving the peak performance of the chip provided by the embodiment of the present invention.

10—power supply device;

101—first circuit unit;

102—second circuit unit;

11—load.

DETAILED DESCRIPTION

To make objects, technical solutions and advantages of the invention clearer, hereinafter the invention is further explained in details with reference to the accompanying drawings and embodiments. It shall be understood that the detailed embodiments described here are only to explain the invention, not limiting the invention.

It shall be noted that when the specification specifies reference signs for elements in the drawings, although the same reference sign is shown in different drawings, the same reference sign represents the same element as could as possible. In addition, in the below description of the disclosure, when detailed descriptions of the known functions and constructions incorporated into the invention make the subject matter of the disclosure quite unclear, the detailed descriptions will be omitted.

Further, when the elements in the disclosure are described, terms such as "first" "second", "A", "B", "(a)", "(b)" and the like may be used. These terms are only to distinguish one element from other elements, and essence, order, sequence, or number of the corresponding element is not limited thereto. When one element is described to be "connected to", "coupled to" or "linked to" another element, it shall be understood that one element can be directly connected or coupled to another element, and also can be "connected to", "coupled to" or "linked to" another element via a third element, or the third element may be interposed between one element and another element.

Still further, with respect to citation of "one embodiment", "embodiments", "exemplary embodiment", or the like, it refers to that the described embodiment may include specific features, structures or characteristics, not that each embodiment must include these specific features, structures or characteristics. In addition, such expression does not refer to the same embodiment. Further, when the specific features, structures or characteristics are described combining with the embodiments, no matter whether they are clearly described, it has indicated that combination of these features, structures or characteristics into other embodiments is within the scope of knowledge of those skilled in the art.

Even further, the specification and subsequent claims use certain phrases to name specific components or parts, and those ordinary in the art shall understood that manufacturers can use different nouns or terms to call the same component or part. The specification and subsequent claims do not distinguish the components or parts with difference of names, but difference in functions as distinguishing criterion. In the whole specification and subsequent claims, "comprise" and "include" mentioned are open words, so they shall be explained to "include but not limited to". Moreover, the word "connect" includes any direct or indirect electrical connection means. Indirect electrical connection means includes connection through other devices.

As mentioned earlier, the prior art usually improves the TDP of the processor chip through improving the efficiency of the power supply, thereby improving the peak performance of the processor chip. However, it is very difficult to improve the efficiency of the power supply, which often brings additional problems, such as higher cost, larger size, slow response. In addition, in the prior art, the dynamic performance of the power supply is a minor design indicator, which means it is only to ensure that the load of the power supply can work safely and normally. The present invention greatly improves the peak performance of the processor chip by studying the relationship between the peak performance of the processor chip and the dynamic performance of the power supply, and by reasonably designing the dynamic performance of the power supply.

The embodiment of the present invention reveals the actual factors that really affect the peak performance of the processor chip by studying the relationship between the peak performance of the processor chip and the performance of the power supply. The peak performance of the processor chip can be greatly improved under the same heat dissipation capability by reasonably designing the affecting factor.

FIG. 1 is the flow diagram of the method for improving the peak performance of the chip provided by the present embodiment;

A method for improving a peak performance of a chip includes:

S1: The maximum dynamic working voltage change of the processor is determined according to the impedance ratio of the characteristic impedance of the power supply supplying power to the processor chip to the load impedance of the processor, and the impedance ratio is less than 1.

The dynamic working voltage change of the processor includes the working voltage drop of the processor when the load rises, and the working voltage rise of the processor when the load falls. The situation that the load rise refers to the load jumping from the first load, such as a light load, to the second load, such as a heavy load, and the situation that the load fall refers to the load jumping from the third load, such as a heavy load, to the fourth load, such as a light load. The first load is less than the second load, and the fourth load is less than the third load. The maximum dynamic working voltage change of the processor includes the maximum working voltage drop of the processor and the maximum working voltage rise of the processor.

In some embodiments, the characteristic impedance can be determined according to the ratio of the equivalent inductance of the power supply to the output side equivalent capacitance. And the load impedance is determined according to the ratio of the output voltage of the power supply to the maximum step current provided by the power supply. The impedance ratio, the maximum dynamic working voltage change of the processor and the relationship therebetween will be described in detail below.

Figures 1, 2:
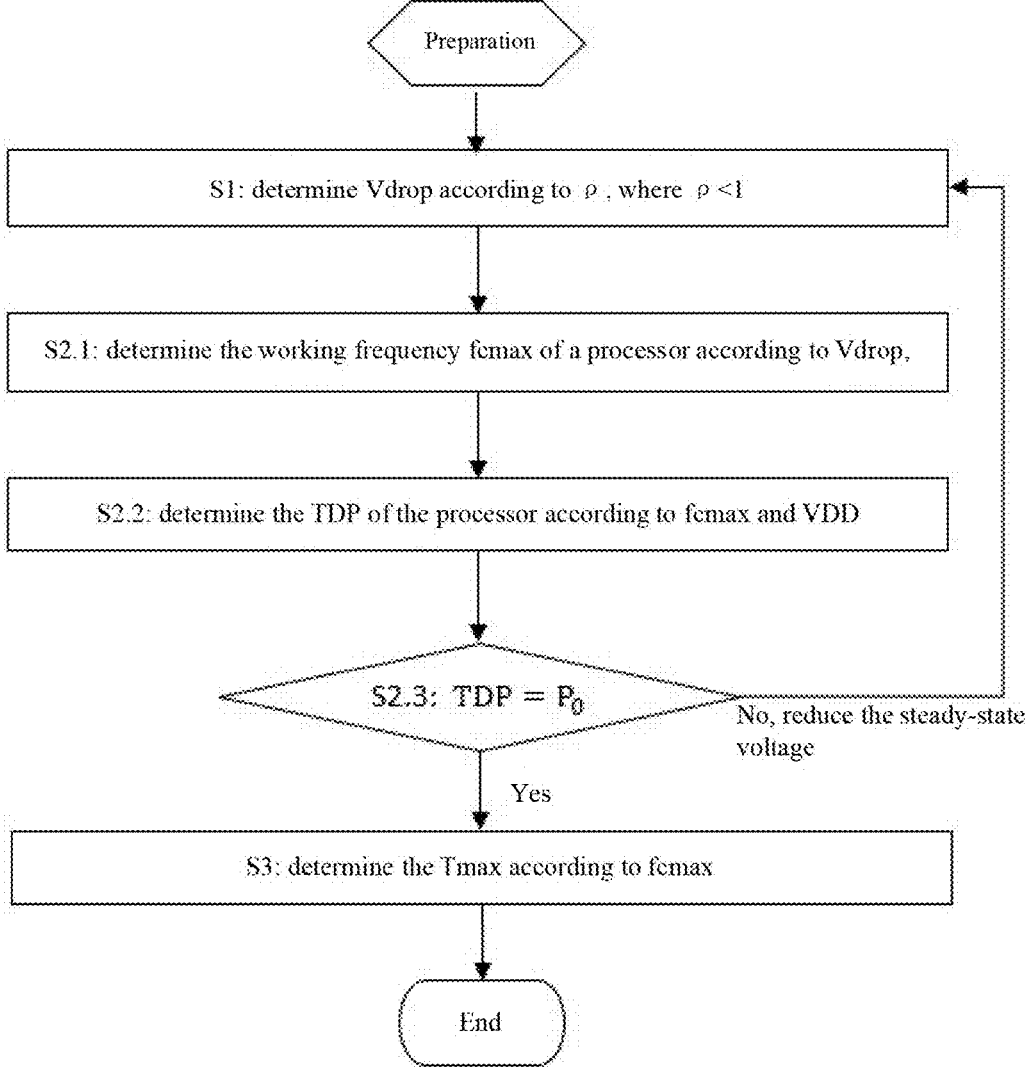

In the present embodiment, in order to study the relationship between the impedance ratio and the dynamic working voltage of the power supply, the circuit model of the power supply as shown in FIG. 2 is established by taking the Buck circuit as an example. As shown in FIG. 2, the power supply 10 is a network including at least two ports, such as input port and output port. The power supply 10 receives an input voltage $v_{in}$ at the input port and converts it into an output voltage vout at the output port. The output voltage vout is then transmitted to the load 11 through a transmission path between the power supply 10 and the load 11, and a working voltage $v_0$ is supplied to the load 11.

Taking the load 11 as a processor such as GPU for example, $R_{pkg}$ and $L_{pkg}$ in FIG. 2 are the packaging resistance and packaging inductance inside the processor chip. Generally, in order to maintain the signal integrity, a large number of filter capacitors are connected in parallel between the positive and negative terminals of the power supply inside and outside the processor chip. The $C_{m2}$ in FIG. 2 represents the equivalent capacitance of these filter capacitors, and $R_{m2}$ and $L_{m2}$ are the equivalent series resistance and equivalent series inductance of these capacitors, respectively. $C_{m1}$, $R_{m1}$ and $L_{m1}$ in FIG. 2 respectively represent the capacitance, equivalent series resistance and equivalent series inductance of the output capacitor of the power supply 10. $R_{PDN}$ and $L_{PDN}$ are the equivalent resistance and equivalent inductance on the transmission path between the power supply 10 and the load 11. $L_{eq}$ is the equivalent inductance of the power supply, that is, the equivalent inductance seen from the output port of the power supply after removing the output capacitor of the power supply. For instance, when the topology of the power supply is a Buck circuit, $L_{eq}$ is a Buck inductor. In fact, the topology of the power supply can be of any type, such as Buck-Boost circuit, Boost circuit, LLC resonant circuit, flyback circuit or forward circuit. Generally, when supplying power to loads such as CPU or GPU, Buck circuit and LLC resonant circuit are commonly used.

Figures 1, 2, 3:
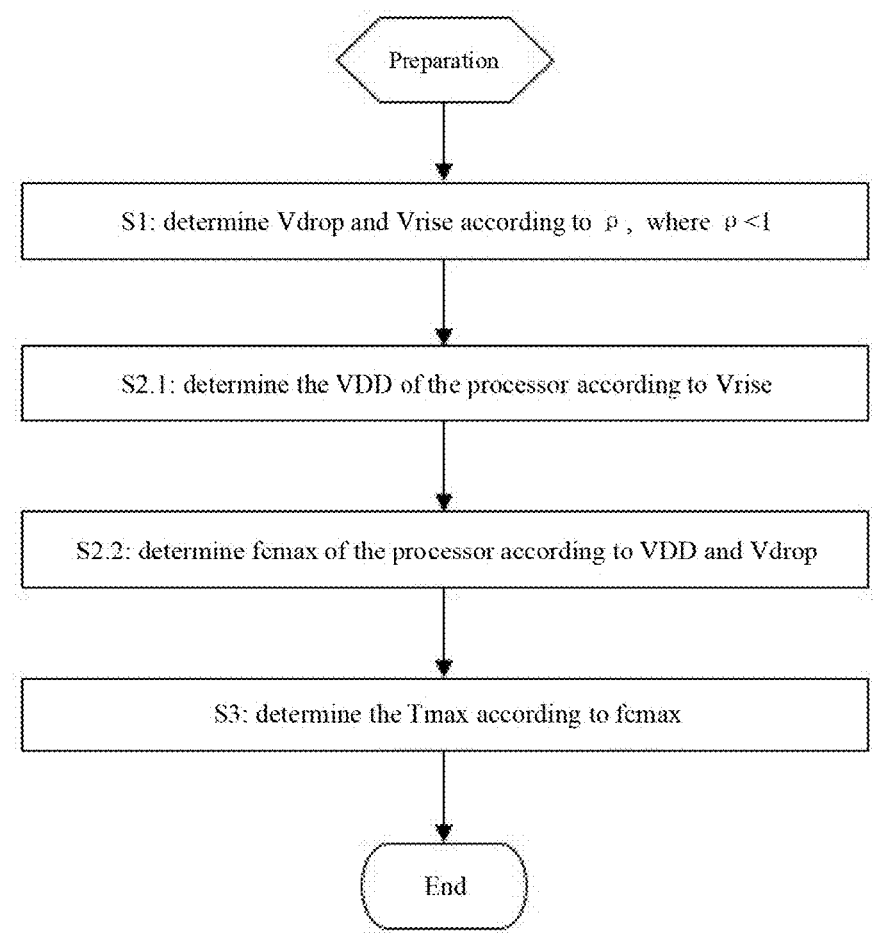
Figure 2:
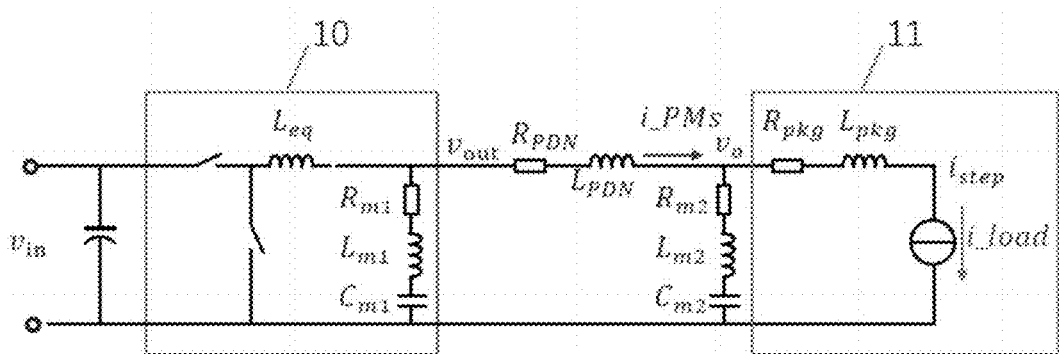
Figure 3:
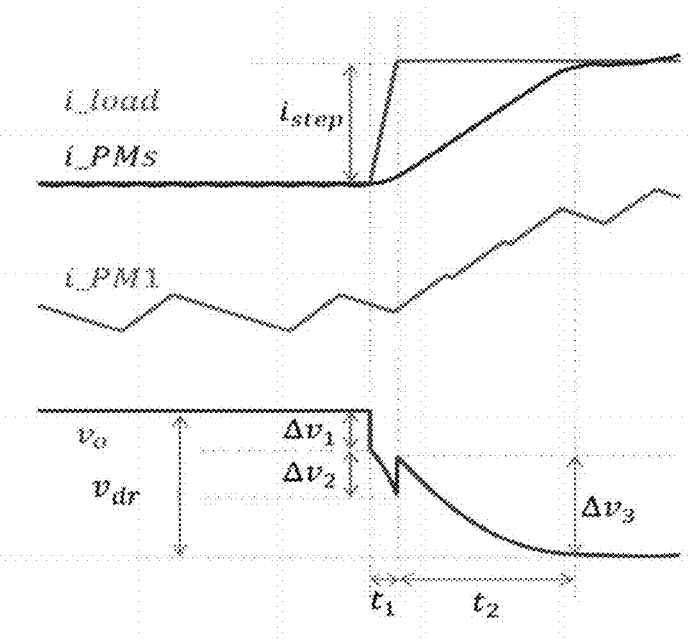

The dynamic waveforms of current and voltage are shown in FIG. 3 when the load in FIG. 2 becomes heavier. As shown in FIG. 3, i_PMs is the current on the transmission path. From the moment when the load starts to increase, after the time period t1, the current i_load will increase by a rise step $i_{step}$ with a certain rise rate. However, the current through the path between the power supply 10 and the load i_PMs will rise at a slower speed. After the time t1 and t2, it will rise to a value close to i_load. Accordingly, the working voltage $v_0$ is changed by a dynamic working voltage change v'. At this time, the dynamic working voltage change v' is reflected as a voltage drop $V_{dr}$, and its value is shown as the following formula:

$$v' = v_{dr} = (R_{pkg} + R_m) \cdot i_{step} + \frac{1}{2} \cdot \frac{i_{step}^2}{V_{DD}} \cdot \frac{L_{eq}}{C_m} \cdot \frac{f_{sw}}{f_{max} - f_{sw}} \tag{1}$$

Where, $R_m$ is the equivalent resistance of the network wherein the resistors $R_{m1}$ and $R_{PDN}$ in FIG. 2 are connected in series and then connected with $R_{m2}$ in parallel; $C_m$ is the equivalent capacitance of the network wherein the capacitors $C_{m1}$ and $C_{m2}$ are connected in parallel, that is, $C_m$ represents the equivalent value of all capacitors connected in parallel from the output port of the power supply to input port of the chip; $f_{sw}$ is the steady-state switching frequency of the power supply before the load changes; $f_{max}$ is the maximum switching frequency of the power supply during the dynamic process; $f_{max}$ will be greater than $f_{sw}$. $V_{DD}$ is the steady-state value of the working voltage $v_o$.

The voltage drop time $t_2$ can be expressed as:

$$t_2 = \frac{i_{step}}{\frac{V_{DD}}{L_{eq}} \cdot \left( \frac{f_{max}}{f_{sw}} - 1 \right)} \tag{3}$$

The maximum value of the step current $i_{step}$ that the power supply can provide is defined as $i_{max}$. During the load increasing process, when $i_{step} = i_{max}$, the corresponding working voltage drop of the processor is expressed as:

$$v_{dr\_max} = (R_{pkg} + R_m) \cdot i_{max} + \frac{1}{2} \cdot \frac{i_{max}^2}{V_{DD}} \cdot \frac{L_{eq}}{C_m} \cdot \frac{f_{sw}}{f_{max} - f_{sw}} \tag{4}$$

When $R_{pkg}$ and $R_m$ are small enough to be ignored, the corresponding working voltage drop is expressed as:

$$v_{dr\_max} = \frac{1}{2} \cdot \left( \frac{\sqrt{\frac{L_{eq}}{C_m}}}{V_{DD}/i_{max}} \right)^2 \cdot \frac{f_{sw}}{f_{max} - f_{sw}} \cdot V_{DD} \tag{5}$$

The load time constant is defined as $$\tau = \frac{V_{DD}}{i_{max}} C_m,$$

then the corresponding voltage drop time during the load increasing process under this condition is expressed as:

$$t_{2\_max} = \left( \frac{\sqrt{\frac{L_{eq}}{C_m}}}{V_{DD}/i_{max}} \right)^2 \cdot \frac{f_{sw}}{f_{max} - f_{sw}} \cdot \tau \tag{6}$$

The characteristic impedance of the power supply is defined as $$Z_c = \sqrt{\frac{L_{eq}}{C_m}},$$

and the load impedance $Z_o = V_{DD}/i_{max}$; the impedance ratio $$\rho = \frac{Z_c}{Z_0},$$

then the following formula is satisfied.

$$\frac{v_{dr\_max}}{V_{DD}} = \frac{1}{2} \cdot \rho^2 \cdot \frac{f_{sw}}{f_{max} - f_{sw}} \qquad (5\text{-}1)$$

$$t_{2\_max} = \rho^2 \cdot \frac{f_{sw}}{f_{max} - f_{sw}} \cdot \tau \qquad (6\text{-}1)$$

Therefore, in the load increasing process, the voltage drop corresponding to a certain step current $i_{step}$ is satisfied:

$$v_{dr} = \frac{1}{2} \cdot \rho^2 \cdot \left(\frac{i_{step}}{i_{max}}\right)^2 \cdot \frac{f_{sw}}{f_{max} - f_{sw}} \cdot V_{DD} \qquad (6\text{-}2)$$

According to formulas (5-1), (6-1), (6-2), the impedance ratio $\rho$ has a significant impact on the drop voltage and drop time under arbitrary rise of the load, and the voltage drop and its corresponding drop time are both proportional to the impedance ratio $\rho$.

Figure 4:
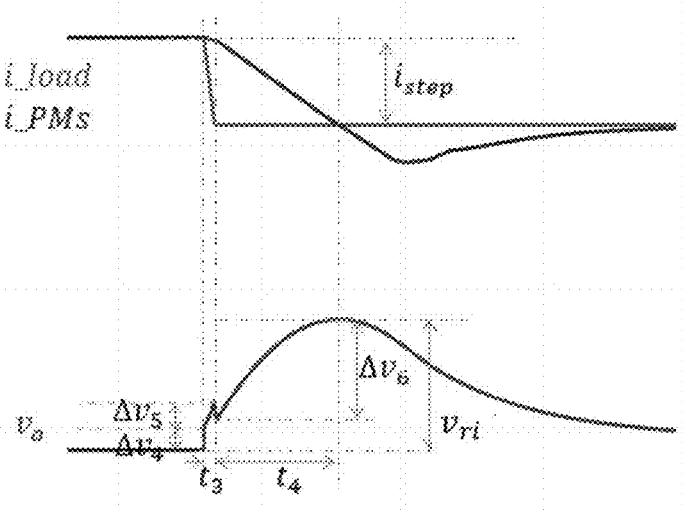
FIG. 4 is a working state diagram during load decreasing process.

The working state of the circuit during a dynamic load decreasing process is shown in FIG. 4, which shows the dynamic waveforms of currents or voltages during the load decreasing process. In this load decreasing process, the dynamic working voltage change v' is the working voltage rise of the processor $v_{ri}$ in the load decreasing process, and the working voltage rise of the processor $V_{ri}$ is expressed as the following formula.

$$v' = v_{ri} = (R_{pkg} + R_m) \cdot i_{step} + \frac{1}{2} \cdot \frac{i_{step}^2}{V_{DD}} \cdot \frac{L_{eq}}{C_m} \qquad (7)$$

In the load decreasing process, when the step current $i_{step}$ is equal to the maximum step current $i_{max}$ that the power supply can provide, the corresponding working voltage rise of the load in the load decreasing process is expressed as the following formula.

$$v_{ri\_max} = (R_{pkg} + R_m) \cdot i_{max} + \frac{1}{2} \cdot \frac{i_{max}^2}{V_{DD}} \cdot \frac{L_{eq}}{C_m} \qquad (8)$$

Similarly, after ignoring $R_{pkg}$ and $R_m$, according to the aforementioned definitions of the impedance ratio $\rho$, characteristic impedance $Z_c$ of the power supply, and the load impedance $Z_o$, then the following formula is satisfied:

$$\frac{v_{ri\_max}}{V_{DD}} = \frac{1}{2} \cdot \rho^2 \qquad (9)$$

Therefore, in the load decreasing process, the voltage rise $V_{ri}$ corresponding to any fall step current $i_{step}$ is expressed as the following formula.

$$v_{ri} = \frac{1}{2} \cdot \rho^2 \left(\frac{i_{step}}{i_{max}}\right)^2 \cdot V_{DD} \qquad (9\text{-}1)$$

Since $V_{dr\_max}$, $V_{ri\_max}$, $V_{dr}$ and $v_{ri}$ reflect the dynamic performance of the power supply, according to formulas (5-1), (6-1), (6-2), (9) and (9-1), the impedance ratio $\rho$ has a significant impact on the working voltage drop of the load and working voltage rise of the load under arbitrary load jump of the power supply. The working voltage drop and working voltage rise are both proportional to the impedance ratio. The smaller the impedance ratio $\rho$, the better the dynamic performance of the power supply.

Generally, there is a minimum load, that is, the lightest load, and a maximum load, that is, the heaviest load, within the working range of the load. When changing from the lightest load to the heaviest load, the step current $i_{step}$ is $i_{upm}$, and the working voltage $v_o$ will have a maximum working voltage drop of the load $v_{drop}$; when changing from the heaviest load to the lightest load, the step current $i_{step}$ is $i_{dom}$, and the working voltage $v_o$ will have a maximum rise voltage $V_{rise}$. Then, according to the previous formulas $i_{upm}$ and $V_{drop}$, $i_{dom}$ and $v_{rise}$ respectively satisfy the following relationships $$v_{drop} = \frac{1}{2} \cdot \rho^2 \cdot \left(\frac{i_{upm}}{i_{max}}\right)^2 \cdot \frac{f_{sw}}{f_{max} - f_{sw}} \cdot V_{DD}, \ v_{rise} = \frac{1}{2} \cdot \rho^2 \left(\frac{i_{dom}}{i_{max}}\right)^2 \cdot V_{DD}.$$

Particularly, when the load is GPU, CPU or other chips, its work tasks are random and vary greatly. When switching between various tasks, there is a maximum working voltage drop of the processor $V_{drop}$ and a maximum working voltage rise of the processor $V_{rise}$, corresponding to the working voltage drop of the processor and working voltage rise of the processor when the chip switches between the lightest task and the heaviest task.

In the prior art, the impedance ratio $\rho$ is generally designed to be relatively large, usually greater than 1, which means that the characteristic impedance of the power supply is greater than the load impedance. In this design, the value of $L_{eq}$ is often relatively large, which means that the current ripple of the power supply is small and the conduction loss of the components of the power supply is small, so the efficiency of the power supply can be improved. The improvement of the efficiency of the power supply can increase the energy supplied to the load e.g. a processor chip, thereby increasing the TDP of the processor chip, which is helpful to improve the peak performance of the processor chip. However, the efficiency of the power supply in the prior art has already reached about 90%-95%, so the space for the efficiency improvement is very limited. Therefore, the improvement of the efficiency of the power supply has limited impact on the improvement of the peak performance of the processor chip.

According to the previous analysis, since the impedance ratio $\rho$ has a significant impact on the working voltage drop of the load and working voltage rise of the load, the smaller the impedance ratio ρ, the better the dynamic performance of the power supply. Therefore, in the present embodiment, it is considered that the impact of the dynamic performance of the power supply on the peak performance of the load, e.g. the processor chip when the characteristic impedance of the power supply is less than the load impedance, that is ρ<1. When ρ<1, the dynamic performance of the power supply is improved greatly. In this case, the system bandwidth is high, the speed of following the command voltage is fast, and the ability to suppress the input voltage disturbance is strong. During the increasing of the load, the inductance (Leq) and capacitor (Cm) network stores energy quickly, and the output voltage drop is small. During the decreasing of the load, the inductance (Leq) and capacitor (Cm) network releases energy quickly, and the output voltage overshoot is small. Due to the small impedance, the power supply device can use components with smaller equivalent inductance and the volume of inductor can be further reduced to increase the power density, thereby meeting the future demands of the power supply in the horizontal or vertical layout. Specifically, ρ can also be in the following range, for example, ρ<0.9, ρ<0.8, ρ<0.6, ρ<0.5, or even ρ<0.3, and within these ranges, the dynamic performance of the power supply is further improved, thereby greatly improving peak performance of the processor chip. The relationship between the dynamic performance of the power supply and the peak performance of the chip will be further analyzed later.

S2. The peak working frequency of the processor is determined according to the maximum dynamic working voltage change of the processor.

This step includes various sub-steps under different conditions, as shown in FIG. 1-1 to FIG. 1-3. Next, let's look at the relationship between the maximum dynamic working voltage change of the processor and the peak working frequency of the processor chip.

In the specific situation, assuming the processor chip includes multiple cores, and the working voltages and frequencies of these cores are the same, then the TDP of the chip can be expressed as:

$$TDP = P_{dyn} + P_{stat} = C_e \cdot N_{cuda} \cdot f_{cmax} \cdot V_{DD}^2 + V_{DD} \cdot I_{leak} \qquad (10)$$

Where, $P_{dyn}$ is the dynamic power; $P_{stat}$ is the static power; $C_e$ is the equivalent capacitance of a single core in the chip; $N_{cuda}$ is the number of cores in the chip; $f_{cmax}$ is the peak working frequency of the processor chip; $V_{DD}$ is the steady-state working voltage of the processor chip; $I_{leak}$ is the leakage current of the processor chip.

Figures 1, 5:
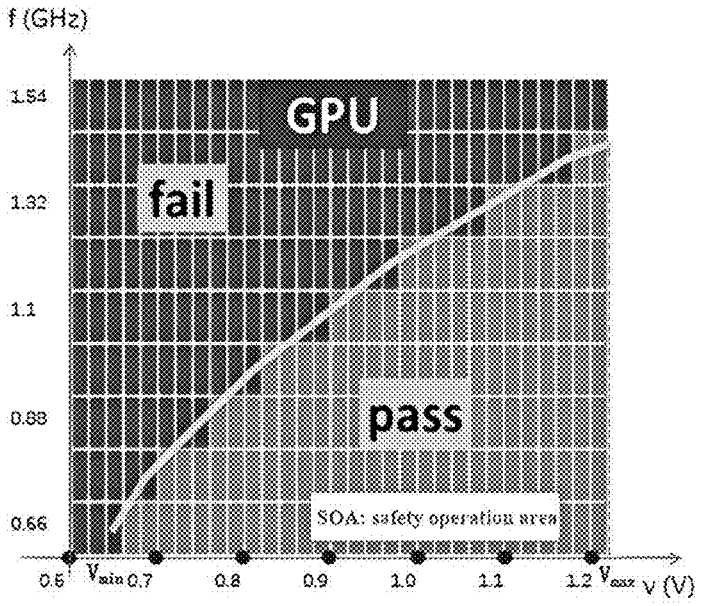
Figures 2, 5:
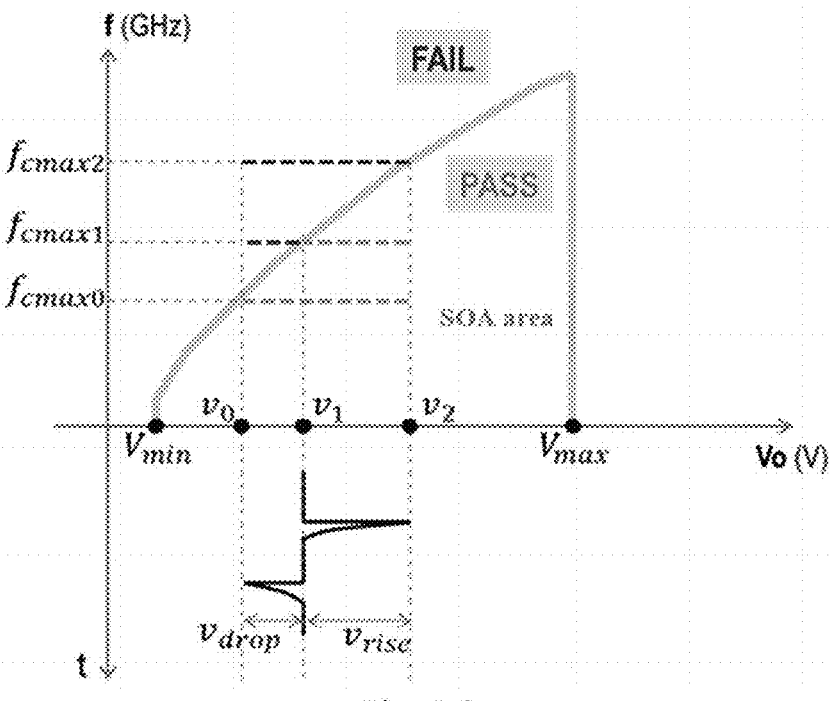
Figures 3, 5:
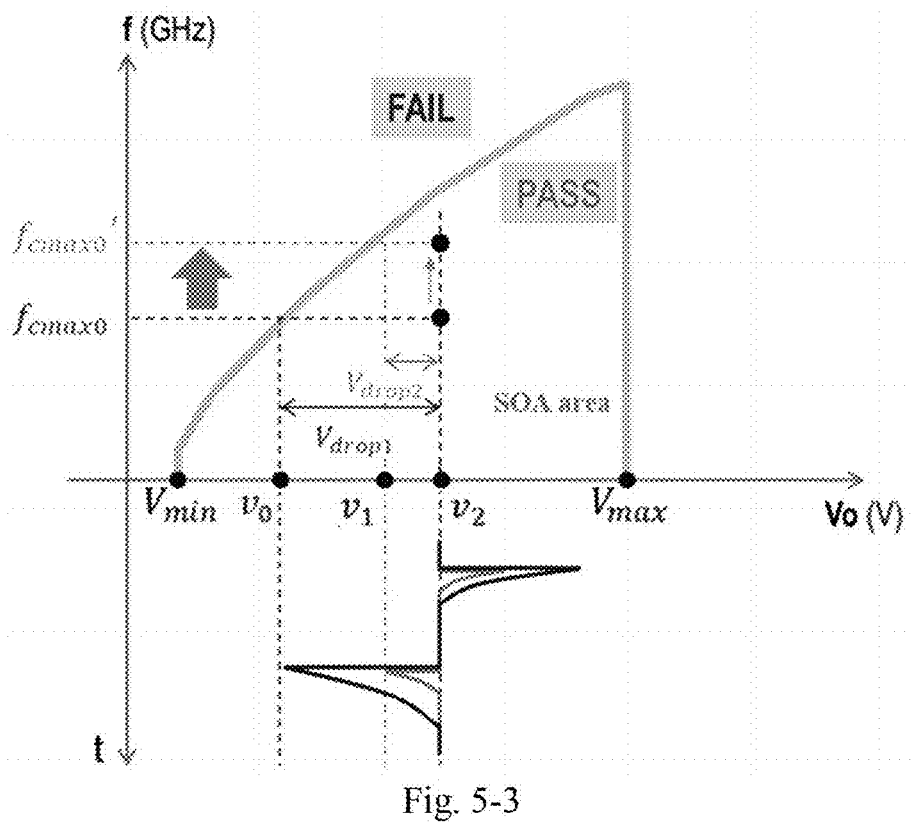
Figures 4, 5:
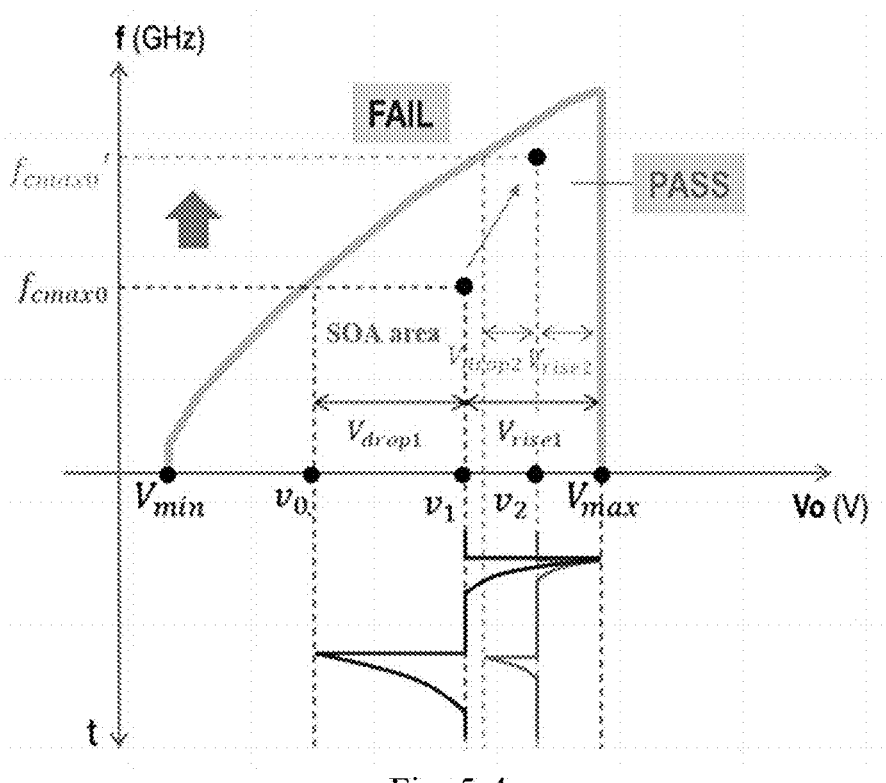

FIG. 5-1 shows the relationship between the working voltage and the working frequency of the processor chip. Taking GPU chip for example, as shown in the figure, the abscissa v is the instantaneous working voltage of the processor chip, and the ordinate f is the working frequency of the processor chip. The curve in the figure is the maximum frequency limit line of the processor chip, which represents the instantaneous working voltage v of the processor chip and the maximum frequency at which the processor chip can operate under the instantaneous working voltage v in a specific process. They are positively related and approximately linear relationship, that is, the peak working frequency can be expressed as:

$$f_{cmax} = k \cdot (v - V_{min}) + f_{cb} \qquad (11)$$

Where, k is the proportional coefficient, representing the slope of the curve, and $f_{cb}$ represents the maximum working frequency of the chip working at the minimum working voltage $V_{min}$. The area at the lower right of the maximum frequency limit line and the area surrounded by the left and right boundary lines are the safety operation areas (SOA) of the processor chip. The area other than the safety operation areas is the failure area of the processor chip. That is to say, under a certain working voltage, the working frequency of the processor chip cannot rise infinitely. When the working frequency of the processor chip exceeds the curve and enters the failure area, it will cause the problem of signal integrity, thereby leading to the failure of the chip. At the same time, the voltage of the processor chip cannot exceed the left boundary $V_{min}$ and the right boundary $V_{max}$ of the safety operation area. Once the boundary is exceeded, the processor chip will work abnormally or even be damaged due to exceeding the normal working voltage range. When the working point of the processor chip is selected, the corresponding voltage and frequency cannot be directly selected on the boundary line of the safety operation area. In actual situations, the voltage ripple of the processor chip during steady-state and the fluctuation of the working voltage caused by the dynamic changes on the work tasks of the processor chip must be taken into account. Therefore, the working frequency of the processor must be ensured always within the safety operation area in the voltage variation range.

According to the formulas (10) and (11), the following formula is got.

$$TDP = C_e \cdot N_{cuda} \cdot [k \cdot (v - V_{min}) + f_{cb}] \cdot V_{DD}^2 + V_{DD} \cdot I_{leak}$$

FIG. 5-2 shows the waveform of the working voltage of the processor chip core and its corresponding frequency. $v_0$ is the minimum working voltage of the core; $v_2$ is the maximum working voltage of the core, and $v_1$ is the steady-state working voltage of the core, namely $V_{DD}$. $v_{drop}$ represents the maximum working voltage drop of the core when the load jumps from the lightest to the heaviest, and $v_{rise}$ represents the maximum working voltage rise of the core when the load jumps from the heaviest to the lightest. $v_0 = v_1 - v_{drop}$, $v_2 = v_1 + v_{rise}$. In order to ensure that the processor chip can work normally in the voltage range from $v_0$ to $v_2$, the frequency $f_{cmax0}$ corresponding to the lowest voltage $v_0$ must be selected as the highest working frequency of the processor chip. If a relatively high frequency $f_{cmax1}$ or an even higher frequency $f_{cmax2}$ is selected, some voltage operating points between $v_0$ and $v_2$ will exceed the safety operation area. Furthermore, according to formula (11), the peak working frequency is expressed as:

$$f_{cmax0} = k \cdot (v_0 - V_{min}) + f_{cb} = k \cdot (V_{DD} - v_{drop} - V_{min}) + f_{cb} \qquad (12)$$

According to the formula 12, if $V_{DD}$ is unchanged, $f_{cmax0}$ will increase when $v_{drop}$ decreases. Since the peak performance $T_{max}$ is positively related to $f_{cmax0}$, e.g. approximately proportional to $f_{cmax0}$, the peak working frequency increases, and the peak performance increases as well, as shown in FIG. 5-3.

When $V_{DD}$ is relatively large, as shown in FIG. 5-4, in order to enable the processor chip to work in the safety operation area during load decreasing, the maximum voltage $v_2$ cannot exceed the right boundary $V_{max}$ of the safety operation area, so its maximum $V_{DD}$ can be expressed as $V_{DD}$ $V_{max}-v_{rise}$, and according to formula (11), the peak working frequency can be expressed as:

$$f_{cmax0} = k \cdot (v_0 - V_{min}) + f_{cb} = k \cdot (V_{max} - v_{rise} - v_{drop} - V_{min}) + f_{cb} \quad (13)$$

According to formula 13, when the maximum voltage of the processor chip reaches the right boundary $V_{max}$ of the safety operation area, if $v_{drop}$ and $v_{rise}$ decrease, $f_{cmax0}$ will increase. Since the peak performance $T_{max}$ is positively related to $f_{cmax0}$, e.g. proportional to the peak working frequency $f_{cmax0}$, the peak performance of the processor chip increases correspondingly, as shown in FIG. 5-4.

Therefore, according to the above analysis, reduction of $v_{drop}$ and $v_{rise}$ when the dynamic occurs is helpful to improving the peak working frequency of the processor, thus improving the peak performance $T_{max}$.

As mentioned above, step S2 includes several different situations, which will be described below.

FIG. 1-1 is the flow chart of the design method for the peak performance of the processor chip when air cooling is used, and the steady-state working voltage $V_{DD}$ of the processor chip remains unchanged. Compared with FIG. 1, step S1 in this figure is basically the same as the previous description, except that in FIG. 1-1 the maximum dynamic working voltage change of the processor in step S1 in FIG. 1 is replaced by the maximum working voltage drop of the processor $v_{drop}$. Step S2 includes four sub-steps from S2.1 to S2.4. According to FIG. 1-1, after the peak working frequency of the processor chip is preliminarily obtained in step S2.1, the TDP of the processor is determined according to the peak working frequency and steady-state working voltage of the chip and formula (10). Then, whether the TDP meets the requirements is determined. When the TDP meets the requirements, go to step S3, and determine the peak performance of the processor according to the peak working frequency of the processor.

Specifically, in the flow as shown in FIG. 1-1, if the TDP of the processor is not equal to the preset power threshold $P_{th}$, the maximum working voltage drop of the processor and the peak working frequency of the processor are re-determined through changing the impedance ratio, and the TDP of the processor is determined according to the peak working frequency and the steady-state voltage of the processor until the TDP of the processor is equal to the preset power threshold. That is, the TDP is compared with the preset power threshold. When the TDP exceeds the preset power threshold (step S2.3), the impedance ratio $\rho$ is increased. When TDP is less than the preset power threshold (step S2.4), the impedance ratio $\rho$ is decreased. Then steps S1-S2.4 are repeated until TDP is equal to the preset power threshold $P_{th}$. When TDP is equal to the preset power threshold, in step S3, the peak performance of the processor is determined according to the peak working frequency of the processor.

FIG. 1-2 is the flow chart of the design method for the peak performance of the processor chip when air cooling is used, and the power of the processor chip remains unchanged. Assuming that the initial power of the processor chip is $P_0$, after steps S1 to S2.2, a new TDP is obtained. In step S2.3, whether the new power TDP is equal to the initial power $P_0$ is determined. When they are not equal, the steady-state voltage of the processor chip is reduced, and then steps S1 to S2.3 are repeated until they are equal.

Finally, in step S3, the peak performance of the processor is determined according to the peak working frequency of the processor.

FIG. 1-3 shows the flow chart of the design method for the peak performance of the processor chip under water cooling or submerged liquid cooling. Generally, the heat dissipation for the processor chip and its power supply is no longer limited, that is, it is generally believed that no matter how much heat is generated by the processor chip and its power supply, it can be dissipated. Therefore, under this condition, for the design of the peak performance of the processor chip, it is mainly considered whether the working voltage of the chip during dynamic process is between the left boundary $V_{min}$ and the right boundary $V_{max}$ of the chip safety operation area. As shown in FIG. 1-3, in step S1, the impedance ratio $\rho$ is set to make $\rho<1$, and the maximum dynamic working voltage change of the processor is determined according to the impedance ratio. As shown in FIG. 1-3, the maximum dynamic working voltage change of the processor refers to the maximum working voltage drop of the processor when the load is switched from lightest to heaviest or the maximum working voltage rise of the processor when the load is switched from the heaviest to the lightest. In step S2.1, $V_{DD}$ is determined according to the maximum working voltage rise of the processor under the condition that the peak voltage of the processor does not exceed the right boundary $V_{max}$. In step S2.2, the peak working frequency of the processor chip is obtained according to $V_{DD}$ and the maximum working voltage drop of the processor. And in step S3, the peak performance is determined according to the peak working frequency.

S3: the peak performance of the processor is determined according to the peak working frequency of the processor.

The calculation formula for determining the peak performance of the processor according to the highest working frequency $f_{cmax}$ of the processor is:

$$T_{max} = f_{cmax} \cdot N_{cuda} \cdot N_{ops} \quad (14)$$

Therefore, according to formula (1) to formula (14), since the impedance ratio $\rho$ has a significant impact on the working voltage drop of the processor and working voltage rise of the processor, the smaller the impedance ratio $\rho$, the better the dynamic performance of the power supply. When $\rho<1$, the dynamic performance of the power supply is improved greatly. Thus, in the present embodiment, the dynamic performance of the power supply is improved by setting the characteristic impedance of the power supply to be less than the load impedance, that is the impedance ratio $\rho<1$, so as to reduce the dynamic working voltage change of the processor and the steady-state working voltage. When the TDP of the processor meets the preset power threshold, that is, when the TDP of the processor is unchanged or slightly reduced, the working frequency of the processor is increased to improve the peak performance. Unlike the prior art, the improvement of the dynamic performance of the power supply by making the impedance ratio $\rho<1$ in the present embodiment will not directly improve its own efficiency, but even slightly reduce its own efficiency in some cases. However, because of the improvement of dynamic performance, it is possible to increase the working frequency of the processor so that the increase of the peak performance of the process is got, and the increase is much greater than that got by only improving the efficiency of the power supply.

Here are two specific examples to illustrate how the peak performance of the processor chip is improved by reducing the impedance ratio ρ.

Figure 6:
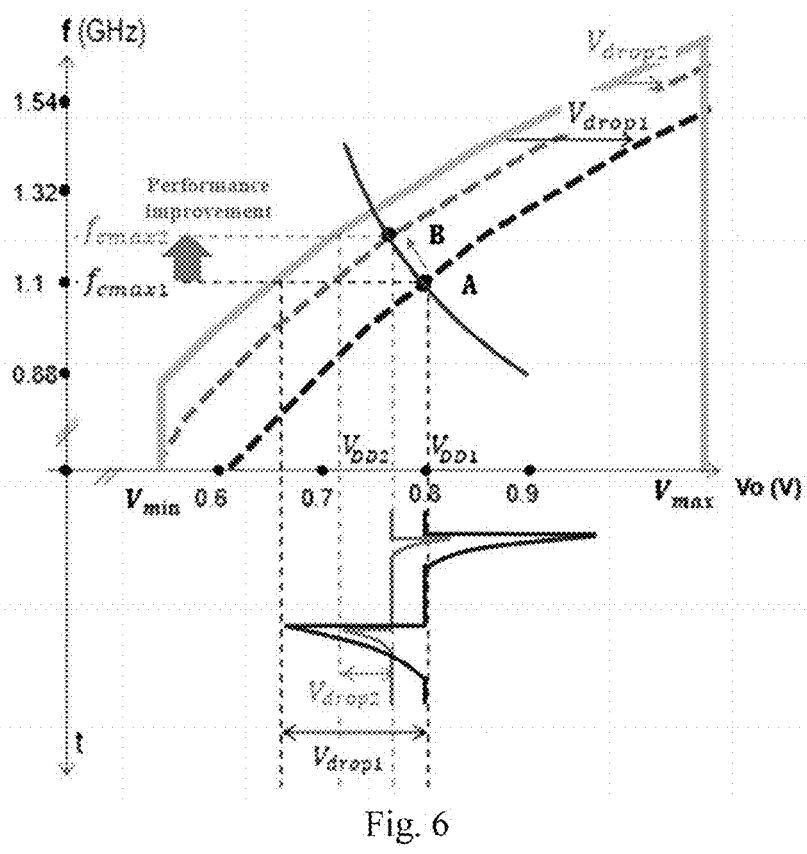
FIG. 6 is a working state diagram for peak performance improvement under air cooling.

FIG. 6 shows a method for improving the peak performance under air cooling. Considering the maximum heat dissipation capacity of the heatsink $P=P_{max}$, and the GPU works under TDP. Since the GPU has already worked at the maximum power, its power should remain unchanged after the peak performance is increased. The TDP of the processor is:

$$TDP = C_e \cdot N_{cuda} \cdot f_{cmax1} \cdot V_{DD1}^2 + V_{DD1} \cdot I_{leak1} =$$ (15)

$$C_e \cdot N_{cuda} \cdot f_{cmax2} \cdot V_{DD2}^2 + V_{DD2} \cdot I_{leak2}$$

Where point A is the working point under the prior art, and point B is the working point represented by the present embodiment. The steady-state working voltage $V_{DD1}$ of the waveform corresponding to point A is the steady-state working voltage, where the impedance ratio ρ is greater than 1, and the steady-state working voltage $V_{DD2}$ of the waveform corresponding to point B is the steady-state working voltage, where the impedance ratio ρ is less than 1; $f_{cmax1}$ is the peak working frequency under the condition that the impedance ratio ρ is greater than 1, and $f_{cmax2}$ is the peak working frequency under the condition that the impedance ratio ρ is less than 1; $I_{leak1}$ is the leakage current when the steady-state voltage of the processor is $V_{DD1}$, and $I_{leak2}$ is the leakage current when the steady-state voltage of the processor is $V_{DD2}$. Compared with the dynamic power loss, the static power loss of the processor is generally small, and the change of the static power loss can be ignored. Therefore, the dynamic power loss is basically the same, and the following formula is got:

$$f_{cmax1} \cdot V_{DD1}^2 = f_{cmax2} \cdot V_{DD2}^2$$ (15-1)

It's known from the previous formula that:

$$f_{cmax1} = k \cdot (V_{DD1} - v_{drop1} - V_{min}) + f_{cb}$$ (15-2)

$$f_{cmax2} = k \cdot (V_{DD2} - v_{drop2} - V_{min}) + f_{cb}$$ (15-3)

Thus, $$f_{cmax1} \cdot V_{DD1}^2 = f_{cmax2} \cdot \left(\frac{f_{cmax2} - f_{cmax1}}{k} + V_{DD1} + v_{drop2} - v_{drop1}\right)^2$$ (16)

Therefore, when $f_{cmax1}$, $V_{DD1}$, k, $v_{drop2}$, $v_{drop1}$ are known, $f_{cmax2}$ can be calculated. Since the peak performance is approximately proportional to the frequency, the peak performance increase ratio is $f_{cmax2}/f_{cmax1}-1$ when the impedance ratio ρ is less than 1. For example, with regard to a processor chip, $V_{DD1}$=0.8V, $f_{cmax1}$=1095 MHz, k=1500 MHz/V. Under the impedance ratio ρ=1.3 of the prior art, $V_{drop1}$=125 mV, and under the impedance ratio ρ=0.6 of the present embodiment, $v_{drop2}$=50 mV. $f_{cmax2}$=1169 MHz can be calculated according to formula (16). Thus, the peak performance increase ratio is:

$$\eta_T = \frac{f_{cmax2}}{f_{cmax1}} - 1 = 6.7\%.$$

With regard to the previous prior art, the efficiency of the power supply needs to be improved by 6.7% in order to achieve such peak performance improvement. Because efficiency of the power supply is already very high, it can hardly be further improved by 1%-2%. Thus it is very difficult to improve the peak performance by improving the power supply efficiency.

Figure 7:
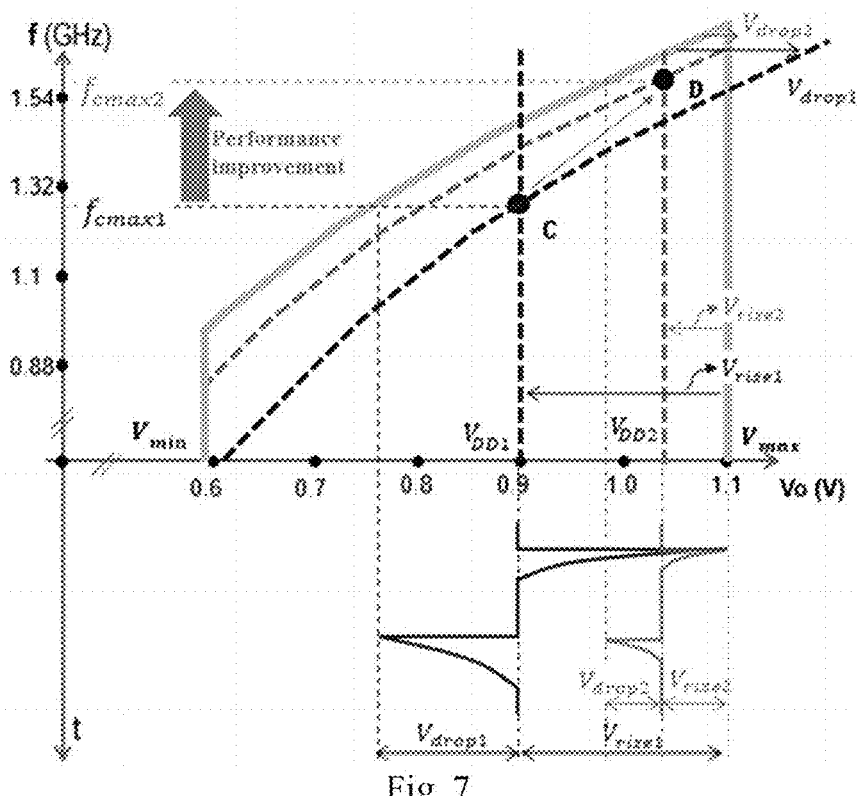
FIG. 7 is a working state diagram for peak performance improvement under water cooling or liquid cooling.

FIG. 7 shows a peak performance improvement method under the water cooling or liquid cooling. In the figure, point C is the working point under the prior art, and point D is the working point of the present embodiment. Under the condition of water cooling or liquid cooling, the processor chip can achieve a higher peak performance without being limited by power. Therefore, under this condition, the steady-state voltage $V_{DD}$ of the processor chip can be increased as much as possible to improve its peak working frequency. Of course, the voltage in the dynamic process is still within the safety operation area SOA. According to the above formula, then the following formula is satisfied:

$$f_{cmax1} = k \cdot (V_{max} - v_{rise1} - v_{drop1} - V_{min}) + f_{cb}$$ (16-1)

$$f_{cmax2} = k \cdot (V_{max} - v_{rise2} - v_{drop2} - V_{min}) + f_{cb}$$ (16-2)

Thereby, the following formula is satisfied:

$$f_{cmax2} - f_{cmax1} = k \cdot (v_{rise1} + v_{drop1} - v_{rise2} - v_{drop2})$$ (17)

According to formula (17), when $f_{cmax1}$, k, $v_{drop2}$, $v_{rise2}$, $v_{drop1}$, $v_{rise1}$ are known, $f_{cmax2}$ can be calculated. Since the peak performance is proportional to the frequency, the peak performance increase ratio is $f_{cmax2}/f_{cmax1}-1$ when the impedance ratio ρ is less than 1. For example, with regard to a processor chip, $f_{cmax1}$=1095 MHz, k=1500 MHz/V. In the prior art, under the impedance ratio ρ=1.3, $v_{drop1}$=125 mV, $v_{rise1}$=200 mV. With the technique of the present embodiment, under the impedance ratio ρ=0.6, $v_{drop2}$=50 mV, $v_{rise2}$=60 mV and $f_{cmax2}$=1417 MHz can be obtained. Thus, the peak performance increase ratio is:

$$\eta_T = \frac{f_{cmax2}}{f_{cmax1}} - 1 = 29\%$$

In the prior art, since the processor power is no longer a limiting condition under the water cooling or liquid cooling condition, improving the power supply efficiency can no longer improve the peak performance.

Figure 8:
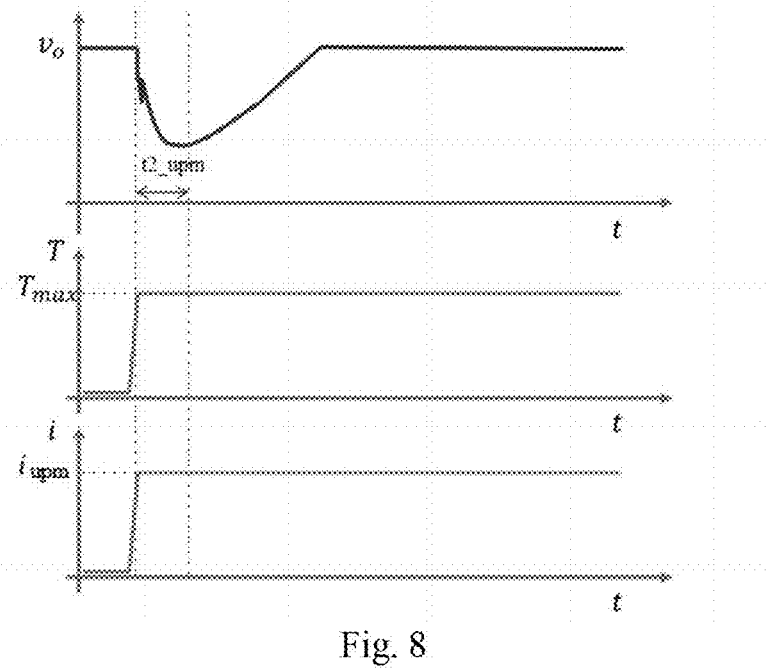
FIG. 8 is a working state diagram considering the impact of dynamic short-time process on chip computing.

The impact of dynamic performance on the peak performance is considered previously. The peak performance represents the steady-state performance of the chip when it works for a long time. In addition, the impact of dynamic short-time process on chip performance should also be considered. As shown in FIG. 8, after the processor chip suddenly changes from the lightest load to the heaviest load $i_{upm}$, the total performance in the corresponding processor chip voltage drop time $t_{2\_upm}$ is the fluctuation performance Q, which is expressed by the formula:

$$Q = T_{max} \cdot t_{2\_upm} \tag{18}$$

The smaller the fluctuation performance Q, the easier the processor chip can accept the frequent performance jumps, and the processor chip can be applied to more algorithm situations. Specifically, the fluctuation performance Q has two parameters. When $T_{max}$ is small, the voltage fluctuation caused by the load jump is small, so even if $t_{2\_upm}$ is large, the load can still jump frequently without affecting the stability of the chip. When $t_{2\_upm}$ is small, the voltage recovers quickly. Even if $T_{max}$ is large, the load can still jump frequently without affecting the stability of the chip.

According to the definition of the peak performance and the previous formula, the following formula can be got.

$$T_{max} = \left( k \cdot \left( V_{DD} \cdot \left( 1 - \frac{1}{2} \cdot \rho^2 \cdot \frac{f_{sw}}{f_{max} - f_{sw}} \right) - V_{min} \right) + f_{cb} \right) \cdot N_{cuda} \cdot N_{ops} \tag{19}$$

According to the definition of the fluctuation performance and the corresponding formula, the following formula can be got:

$$Q = \left( k \cdot \left( V_{DD} \cdot \left( 1 - \frac{1}{2} \cdot \rho^2 \cdot \frac{f_{sw}}{f_{max} - f_{sw}} \right) - V_{min} \right) + f_{cb} \right) \cdot \tag{20}$$

$$N_{cuda} \cdot N_{ops} \cdot \rho^2 \cdot \frac{f_{sw}}{f_{max} - f_{sw}} \cdot \tau$$

Figure 9:
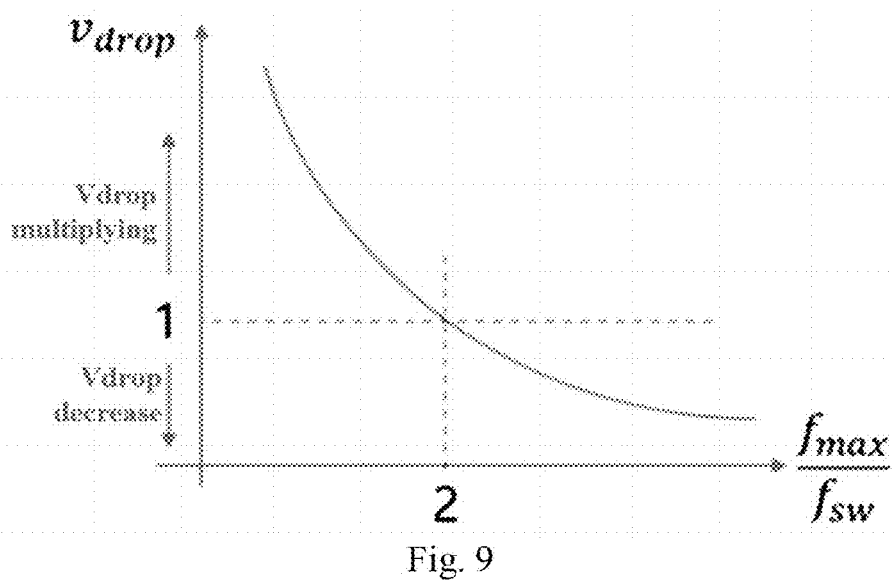
FIG. 9 is the change curve of instantaneous working voltage drop of the processor.

In the above formula, when $$\rho = \sqrt{\frac{f_{max}}{f_{sw}} - 1},$$

the maximum Q is obtained. With reference to formula (1), $v_{drop}$ will change with the variation of $f_{max}/f_{sw}$. The corresponding curve is as shown in FIG. 9. When $f_{max}/f_{sw} < 2$, $v_{drop}$ will be multiplied with the decrease of $f_{max}/f_{sw}$, and when $f_{max}/f_{sw} > 2$, $v_{drop}$ will be reduced with the increase of $f_{max}/f_{sw}$. When $f_{max}/f_{sw} = 2$, there is no impact on $v_{drop}$. Therefore, $f_{max}/f_{sw} \geq 2$ will be selected in general design to achieve the best dynamic effect.

FIG. 10 lists the relationship between Q and ρ when $$\frac{f_{max}}{f_{sw}} = 2,$$

$$\frac{f_{max}}{f_{sw}} = 3,$$

$$\frac{f_{max}}{f_{sw}} = 5.$$

No matter what value $f_{max}/f_{sw}$ is taken, the maximum value of Q will appear in the range where $\rho \geq 1$. It should be pointed out that Q is not the bigger the better. When $\rho < 1$, Q becomes monotonically smaller with the decrease of ρ, so $\rho < 1$ is more favorable for the design of the processor chip.

In addition, for the steady-state performance during long-time work, the relationship between the peak performance $T_{max}$ and ρ should be considered. FIG. 11 shows the relationship between $T_{max}$ and ρ. As shown in FIG. 11, combined with equations (19) and (20), the peak performance increases with the decrease of ρ. In this way, considering both the steady state and the dynamic state, combined with FIG. 10 and FIG. 11, when $$\rho < \sqrt{\frac{f_{max}}{f_{sw}} - 1},$$

especially when ρ<1, not only will the peak performance become larger with the decrease of ρ, but also the impact of the dynamic process on the chip becomes smaller.

Figure 13:
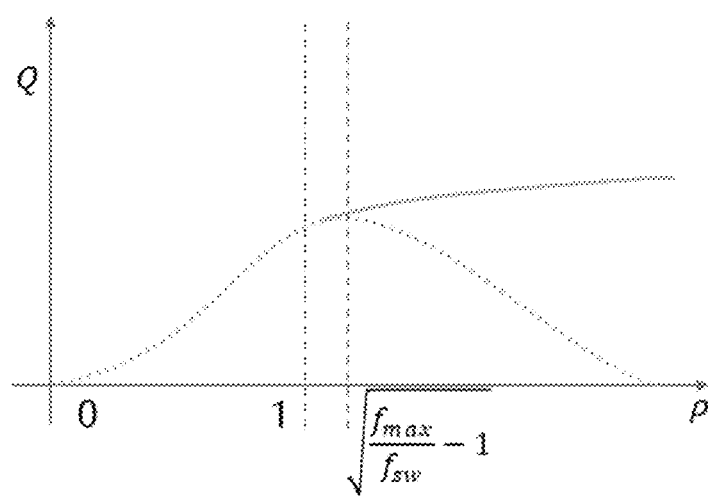
FIG. 13 shows the relationship curve between the fluctuation operand Q and the impedance ratio ρ obtained by the method for improving the peak performance of the chip in the present invention and the method for improving the peak performance in the prior art.

The two curves in FIG. 12 show the relationship between $T_{max}$ and ρ. The dotted line is the relationship curve according to the peak performance calculation formula (19), while the solid line is the relationship corresponding to the prior art. In the prior art, ρ is generally designed to be relatively large, usually ρ>1. In addition, it can be seen from the previous description that in the prior art the peak performance is improved generally by the method of improving the efficiency of the power supply. To improve the efficiency, the switching frequency $f_{sw}$ is reduced and the inductance of inductive components in the power supply is increased. Accordingly, the impedance ratio ρ increases. It can be seen from the solid line curve in FIG. 12 that the increase of ρ brings about the increase of the peak performance $T_{max}$. However, compared with the technology of the present invention as shown in the dotted line, the peak performance $T_{max}$ increases very slowly. This also shows that the peak performance $T_{max}$ can be greatly improved with the decrease of ρ using the technology of the present embodiment, while the peak performance $T_{max}$ can only be improved by a small degree with the increase of ρ using the prior art Similarly, the two curves in FIG. 13 show the relationship between Q and ρ. The dotted line is the relationship shown in the embodiments of the present invention, while the solid line is the corresponding relationship under the prior art. Since in the prior art of reducing frequency and increasing inductance is adopted to improve efficiency, according to formula (16), Q will increase slightly with the increase of ρ. In the present invention, when ρ is less than 1, Q will rapidly decrease with the decrease of ρ.

Since Q is the smaller, the better and ρ selected in the embodiment of the present invention is less than 1, the peak performance gradually increases with the decrease of ρ, as shown in the dotted curve in FIG. 12. Q gradually decreases with the decrease of ρ, as shown in the dotted curve in FIG. 13.

To sum up, compared with the prior art, the embodiment of the present invention can greatly improve the peak performance and further reduce the fluctuation performance. Specifically, p can also be in the following range, for example, ρ<0.9, ρ<0.8, ρ<0.6, ρ<0.5, or even ρ<0.3, and within these ranges, the dynamic performance of the power supply is further improved, thereby greatly improving the peak performance of the chip.

To sum up, in the method for improving a peak performance of a load, e.g. a processor chip provided by the present embodiment, the maximum dynamic working voltage change of the processor is determined according to the impedance ratio of the characteristic impedance of the power supply to the load impedance of the processor, and the impedance ratio is less than 1. The peak working frequency of the processor is determined according to the maximum dynamic working voltage change of the processor. The peak performance of the processor is determined according to the peak working frequency of the processor. Compared with the prior art, the present invention improves the dynamic performance of the power supply by setting the impedance ratio ρ to be less than 1, thereby reducing the maximum dynamic working voltage change of the processor, and improving the peak working frequency of the processor to improve the peak performance.

Figure 14:
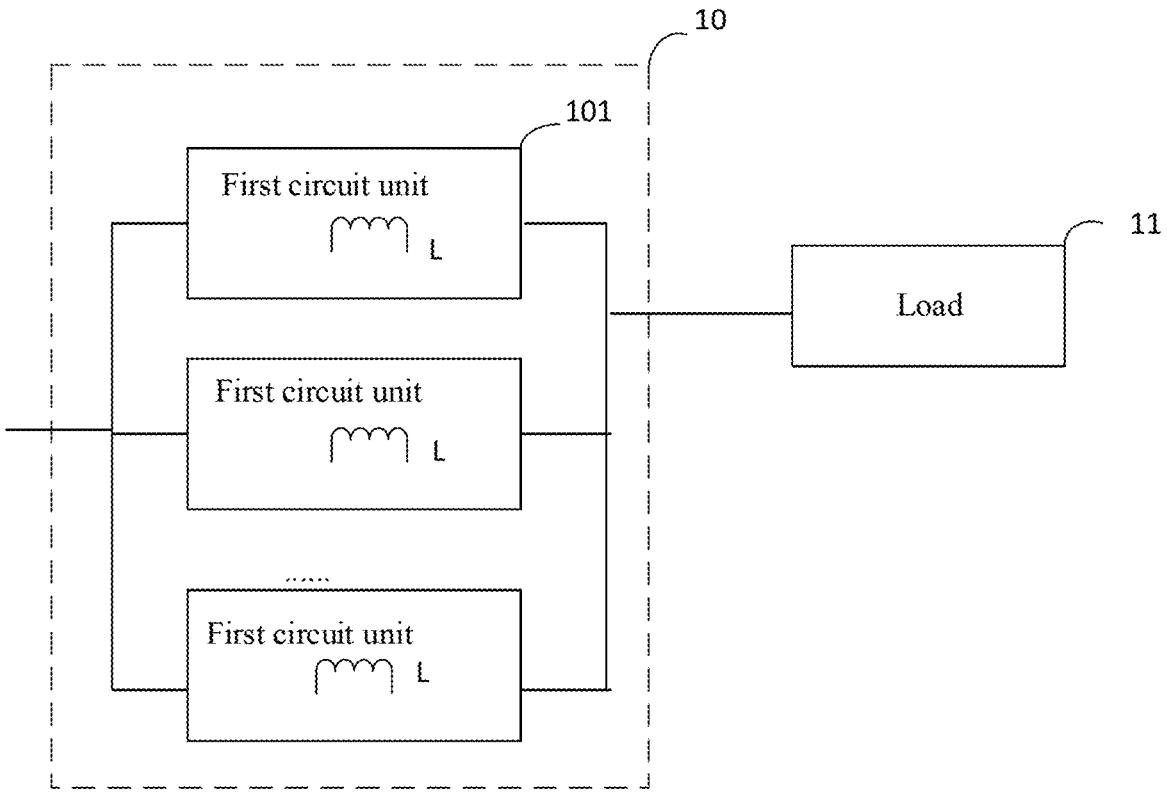
FIG. 14 is a system structure block diagram provided by the present invention for improving the peak performance of the chip.

Furthermore, the present invention provides a system for improving a peak performance of a chip, as shown in FIG. 14, which shows the structure diagram of the system. The system for improving the peak performance of the chip includes a power supply device 10 and a load 11. The load 11 includes a processor chip. The power supply 10 is used for receiving an input voltage and generating an output voltage, and supplying power to the load. The load 11 has a load impedance, and the power supply 10 has a characteristic impedance. The load impedance is defined by the output voltage of the power supply device and the maximum step current provided by the power supply device, and the characteristic impedance is defined by the equivalent inductance of the power supply device and the output side equivalent capacitance The ratio of the characteristic impedance to the load impedance is less than 1.

Specifically, the power supply device 10 includes n first circuit units 101, where n is a positive integer. The first circuit unit 101 can be of the same circuit structure or different circuit structures, but each first circuit unit 101 includes at least one inductor L. When n is greater than or equal to 2, the n first circuit units 101 are connected in parallel, and the equivalent inductance of the power supply device is related to n. The output side equivalent capacitance is related to the total output capacitance of the n first circuit units 101. The n first circuit units 101 directly supply power to the load, and the output side equivalent capacitance is equal to the total output capacitance of the n first circuit units 101. The n first circuit units 101 may have the same or different topology, and all corresponding parameters can be the same or different. For example, the inductance L in FIG. 14 can be the same or different.

Figures 15, 16:
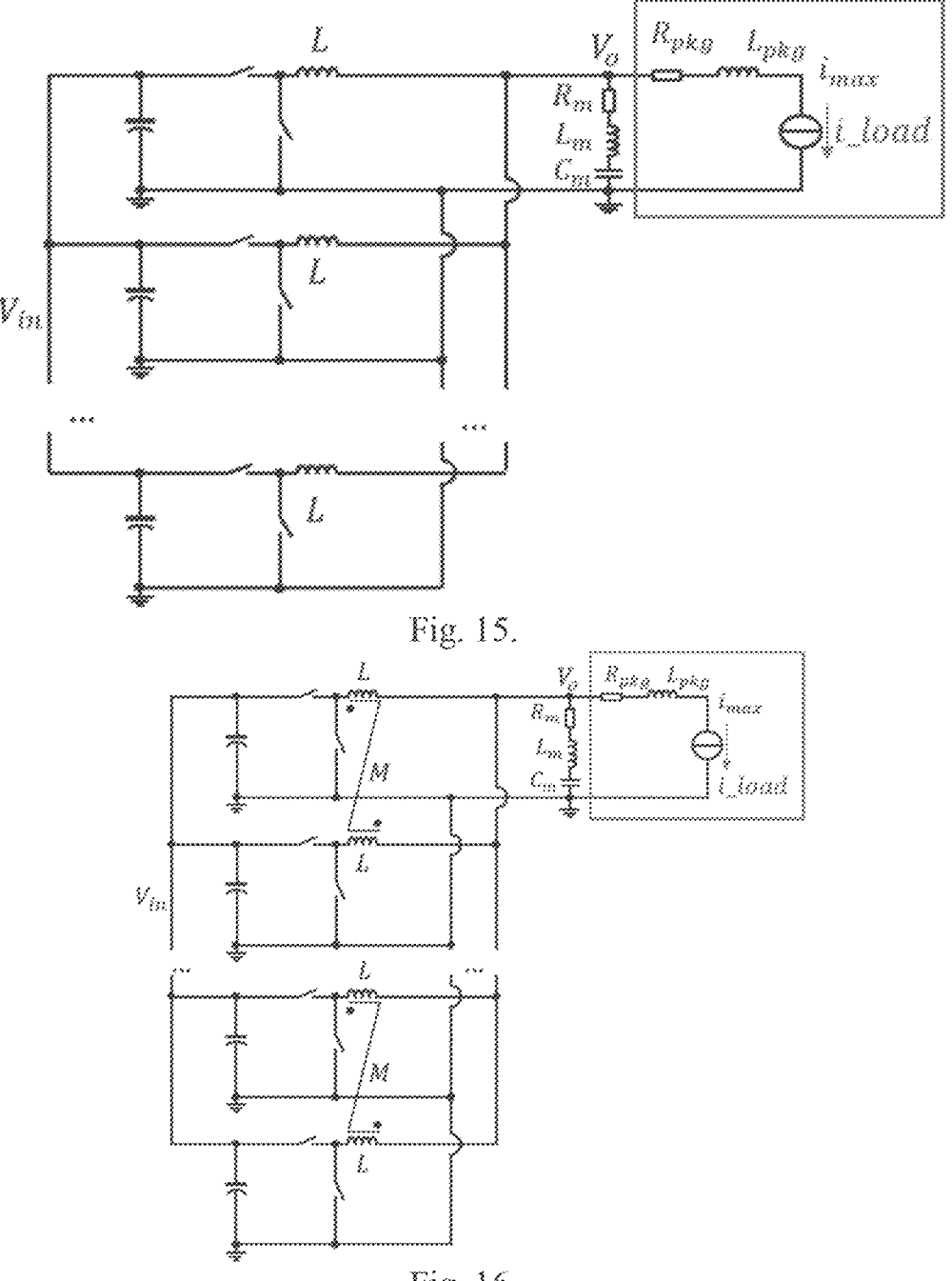
FIG. 15 shows the system circuit topology when the first circuit unit is a Buck circuit.
FIG. 16 shows the system circuit topology using two-phase coupling inductors when the first circuit unit is a Buck circuit.

As shown in FIG. 15, if the n first circuit units are all Buck circuits, and they have the same parameters, the equivalent inductance of the power supply device is expressed as:

$$L_{eq} = \frac{L + M * t}{n} \qquad (21)$$

L is the inductance of the inductor of one first circuit unit. M is the mutual inductance between the inductors of the first circuit units. n is greater than or equal to 1. t is a constant.

Thus, the impedance ratio is expressed as the following.

$$\rho = \frac{Z_c}{Z_o} = \sqrt{\frac{L_{eq}}{C_m}} / (V_{DD}/i_{max}) = \sqrt{\frac{(L + M)/n}{C_m}} / (V_{DD}/i_{max}) \qquad (22)$$

Of course, the inductors of all the first circuit units can be uncoupled or coupled. When the inductors of the first circuit units are uncoupled, M=0, t=0. In some embodiments, the inductors of two first circuit units are coupled, that is, two-phase coupled. FIG. 16 is the topology using two-phase coupled inductors, where the self-inductance of each inductor is L, and the mutual inductance of two coupled inductors is M. When the two inductors are positively coupled, M>0, t=1. When two inductors is reverse coupling or negative coupling, M<0, t=1. The reverse coupling method can further reduce the equivalent inductance. Of course, the inductors of the first circuit units can also be multi-phase coupled, and the number of coupled phases is greater than or equal to 3.

For FIG. 16, assuming that the inductance L of each first circuit unit is about 20 nH, M is about 10 nH, and the inductors of circuit units are reversely coupled, then t is −1. The number n of first circuit units in parallel is 20, and the output capacitance $C_m$ is 6 mF. The maximum current that the power supply can provide is 800 A, and the steady-state working voltage of the load, e.g. the processor chip is 0.8V. $f_{cmax1}$=1095 MHz, k=1500 MHz/V. The switching frequency of each first circuit unit in steady-state working is 1 MHz, and the maximum switching frequency in dynamic state is 3 MHz. Then according to formula (5), formula (16) and formula (22), the impedance ratio ρ=0.61, the maximum working voltage drop of the processor $v_{drop}$=36 mV and the peak performance increase ratio:

$$\eta_T = \frac{f_{cmax2}}{f_{cmax1}} - 1 = 6.7\%.$$

Of course, the steady-state working voltage of the processor chip can be in a voltage range, which refers to the corresponding steady-state voltage within the steady-state load range. The circuit that supplies power to the chip can be designed according to the method described above, so that ρ<1 can be met during the whole range of the steady-state working voltage of the chip, or during a certain part of the steady state working voltage range, or at one or several specific operating points.

The present embodiment is compared with the "high ρ" design method of the prior art. For example, for the same processor chip mentioned above, in the case of using the same number of circuit units with the same topology, in order to achieve high efficiency, in the prior art, the maximum switching frequency of each first circuit unit is about 600 kHz, and the inductance L of each first circuit unit is set to 150 nH, which is far greater than the inductance in the first circuit unit of the present invention. In addition, the number n of the first circuit units in parallel is 20, and ρ and the maximum dynamic voltage $v_{drop}$ are about 1.19 and 133 mV respectively when the inductors of the circuits are uncoupled. In the prior art, the "high ρ" design can achieve the efficiency improvement of about 1%~2%, and currently it can achieve the efficiency of about 90% for heavy loads. Accordingly, the peak performance is also improved by about 1%-2%. When L is increased to a certain extent, that is, when ρ is increased to a certain extent, it has less and less effect on reducing switching loss and conduction loss is, which means that it is more and more difficult to improve efficiency. Therefore, the space for power supply device with "high ρ" design to improve the efficiency in the future is more and more limited, and accordingly, the increase of peak performance is smaller and smaller. And, with "low ρ" design in the present embodiment, ρ is less than 1, and the peak performance is significantly improved.

Figure 17:
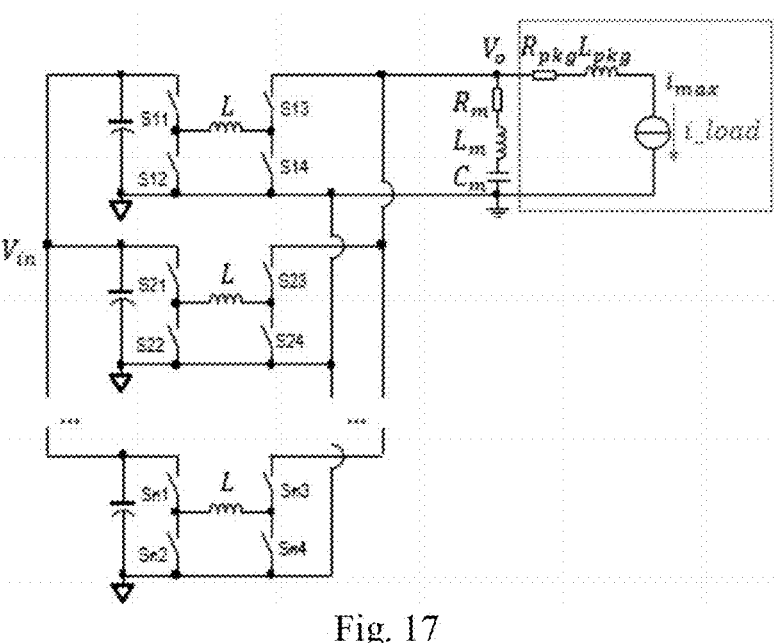
FIG. 17 shows the system circuit topology when the first circuit unit is a Buck-Boost circuit.

FIG. 17 gives another architecture diagram. In FIG. 17, the power supply includes n first circuit units in parallel to supply energy to the load. The topology of each first circuit unit is Buck-Boost. The n first circuit units have the same topology, and the inductance of each first circuit unit is L. The duty cycle of the switch S11, S21, . . . , Sn1 in each first circuit unit is D, and the duty cycle of another switch S12, S22, . . . , Sn2 in each first circuit unit is 1-D. In each circuit unit, diagonal switches such as S11 and S14, S21 and S24, . . . , Sn1 and Sn4 are turned on and off at the same time, and their duty cycles are D. Another pair of diagonal switches in each circuit unit, such as S12 and S13, S22 and S23, . . . , Sn2 and Sn3, are also turned on and off at the same time, and their duty cycles are 1-D. The equivalent inductance of the power supply device is expressed as:

$$L_{eq} = \frac{L(1-D) + M*t}{n} \tag{23}$$

L is the inductance of the inductor of one first circuit unit. M is the mutual inductance between the inductors of the first circuit units. D is the duty cycle of the switch S11, S21, . . . , Sn1 in the first circuit unit. n is greater than or equal to 1. t is a constant.

When inductors are positively coupled with each other, M>0, t=1. When inductors are reversely coupled with each other, M<0, t=1. And when inductors are not coupled, t=0, M=0.

The impedance ratio of buck-boost circuit can be expressed as:

$$\rho = \frac{Z_c}{Z_o} = \sqrt{\frac{L_{eq}}{c_m}} / (V_{DD}/i_{max}) = \sqrt{\frac{(L(1-D) + M*t)/n}{c_m}} / (V_{DD}/i_{max}) \tag{24}$$

Figure 18:
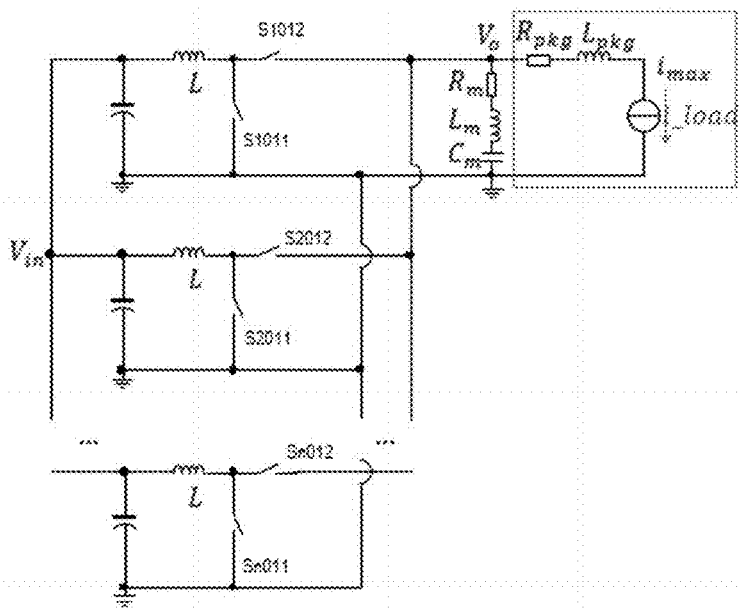
FIG. 18 shows the system circuit topology when the first circuit unit is a Boost circuit.

The topology of the first circuit unit of the power supply in FIG. 18 is a Boost circuit, and the n first circuit units have the same topology. Similarly, the inductance of the first circuit unit is L, the duty cycle of the switch S1011, S2011, . . . , Sn011 in each first circuit unit is D, and the duty cycle of another switch S1012, S2012, . . . , Sn012 in each first circuit unit is 1-D. Therefore, the equivalent inductance of the power supply device is expressed as:

$$L_{eq} = \frac{L(1-D) + M*t}{n} \tag{25}$$

L is the inductance of the inductor of each first circuit unit. M is the mutual inductance between the inductors of the first circuit units. D is the duty cycle of the switch in the first circuit unit; n is greater than or equal to 1. t is a constant.

When inductors are positively coupled with each other, M>0, t=1. When inductors are reversely coupled with each other, M<0, t=1. And when inductors are not coupled, t=0, M=0.

The impedance ratio of boost circuit can be expressed as:

$$\rho = \frac{Z_c}{Z_o} = \sqrt{\frac{L_{eq}}{c_m}} / (V_{DD}/i_{max}) = \sqrt{\frac{(L(1-D) + M*t)/n}{c_m}} / (V_{DD}/i_{max}) \tag{26}$$

In practice, when the first circuit unit is a BUCK circuit, the equivalent inductance of the power supply device can be calculated according to the formula $$u_L = L_{eq} \cdot \frac{i_{step}}{t_2}$$

after measuring the total current $i_{step}$ and its changing time $t_2$ in the dynamic load increasing process of the power supply, and the average value $u_L$ of the inductor voltage which is measured at both ends of the power supply inductor in a switching cycle $$T_{sw} = \frac{1}{f_{sw}}.$$

When the first circuit unit is a Buck-Boost, Boost circuit, the equivalent inductance of the power supply device can be calculated according to the formula:

$$u_L(1-D) = L_{eq} \cdot \frac{i_{step}}{t_2}$$

by measuring the total current $i_{step}$ and its changing time $t_2$ in the dynamic load increasing process of the power supply, and the average value $u_L$ of the inductor voltage in a switching cycle $$T_{sw} = \frac{1}{f_{sw}}.$$

The first circuit unit 101 supplies power to the processor chip can be a buck, buck-boost, or boost circuit. This circuit can be a regulated circuit, which has simple control and fast response speed. In some embodiments, these regulated circuits can also be combined with other non-regulated circuits to supply power to the load.

Figure 19:
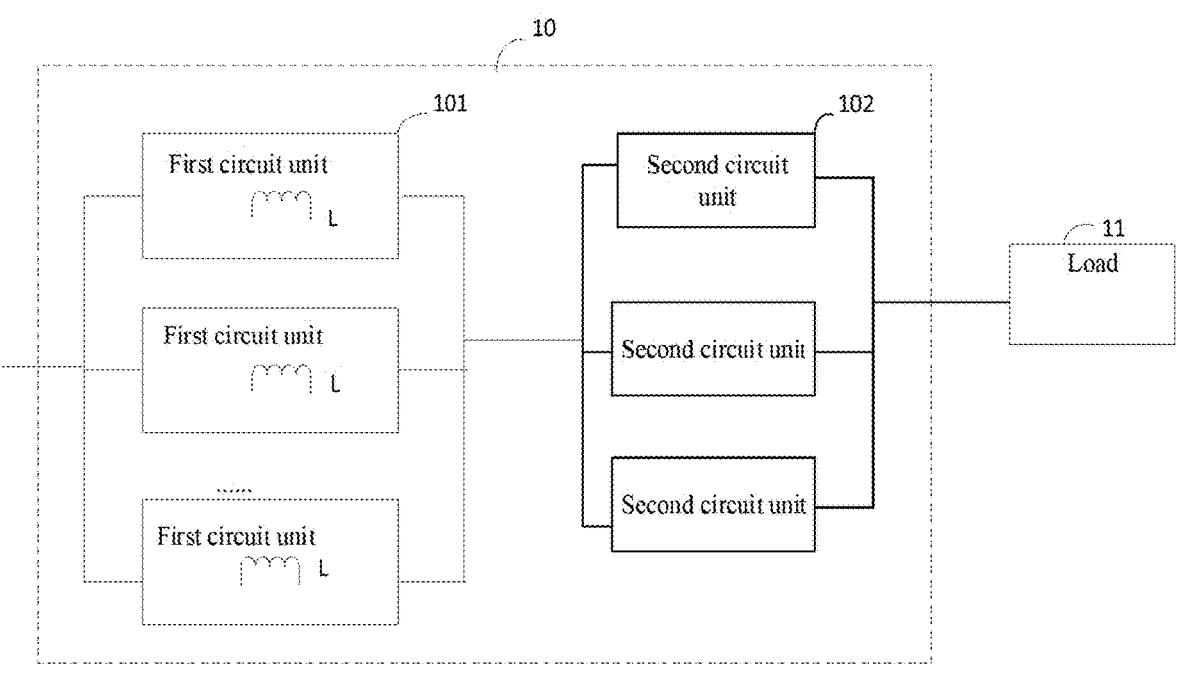
FIG. 19 is another system structure block diagram provided by the present invention for improving the peak performance of the chip.

In some embodiments, as shown in FIG. 19, the power supply device 10 further includes m second circuit units 102, where m is a positive integer. When m is greater than or equal to 2, the m second circuit units 102 are connected in parallel. The output port of the first circuit unit 101 is electrically coupled to the input port of the second circuit unit 102, and the first circuit unit 101 and the second circuit unit 102 form a multi-stage circuit. The output port of the second circuit unit 102 is electrically coupled to the load 11, and the output side equivalent capacitance is determined by the total output capacitance of the n first circuit units 101 and the total output capacitance of the m second circuit units 102. The second circuit units 102 are non-regulated circuits, and the ratio of the input voltage over the output voltage of the second circuit unit 102 is k. The output side equivalent capacitance is satisfied:

$$C_{eq} = C_o + C_1 k^2 \tag{27}$$

Where, $C_0$ is the total output capacitance of the m second circuit units 102, and $C_1$ is the total output capacitance of the n first circuit units 101.

Figure 20:
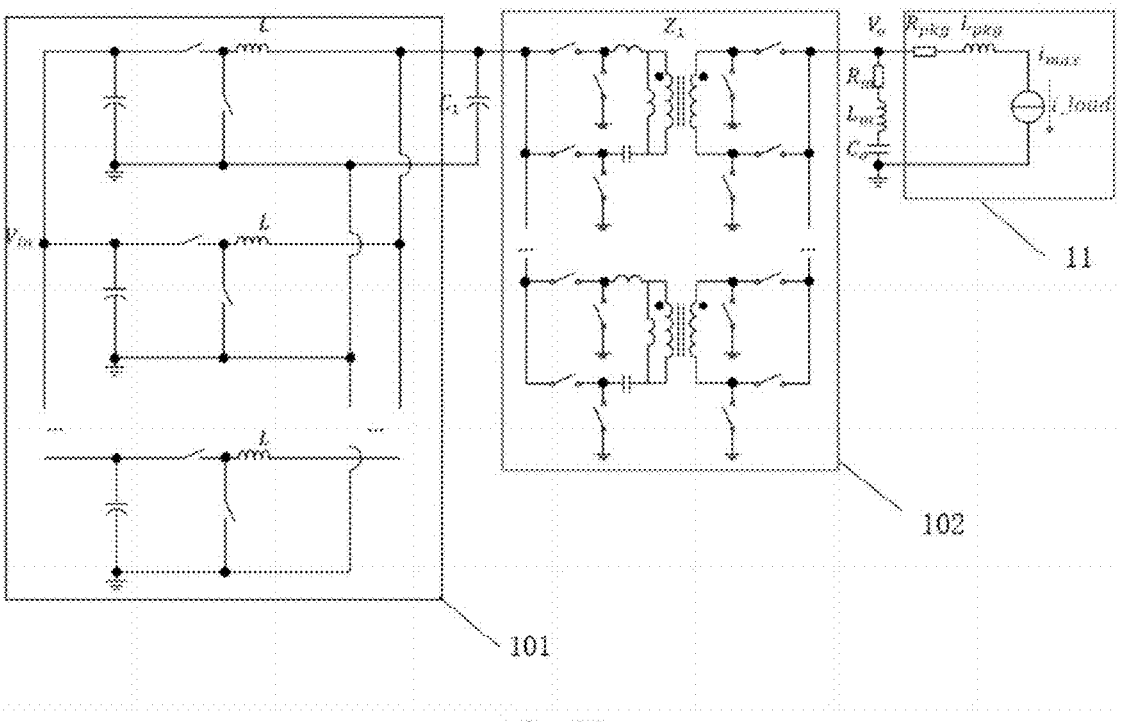
FIG. 20 shows the system circuit topology when the first circuit unit is a Buck circuit and the second circuit unit is an LLC circuit.

As shown in FIG. 20, the first circuit unit in FIG. 20 is a Buck circuit, and the n first circuit units 101 have the same topology. The second circuit unit 102 is an LLC non-regulated circuit. M second circuit units with n first circuit units form a two-stage power supply. The LLC circuit works in the non-regulated state. The LLC circuit includes a transformer with the turn ratio of the primary and secondary windings equal to N:1. The output voltage of the LLC circuit equals to 1/N of the input voltage. This two-stage structure is very suitable for the application with high Vin voltage, such as 40V-60V. The equivalent inductance of the power supply device is equal to the inductance of the inductor, which is expressed as:

$$L_{eq} = \frac{L + M * t}{n * k^2} \qquad (28)$$

L is the inductance of the inductor in the first circuit unit 101. M is the mutual inductance between the inductors of every two first circuit units 101. n is greater than or equal to 1. t is a constant.

When inductors are positively coupled with each other, M>0, t=1. When inductors are reversely coupled with each other, M<0, t=1. And when inductors are not coupled, t=0, M=0.

The output side equivalent capacitance is satisfied:

$$C_{eq} = C_o + C_1 k^2 \qquad (29)$$

k is the ratio of the input voltage to the output voltage of the second circuit unit 102, and is equal to the turn ratio N. $C_o$ is the total output capacitance of the m second circuit units 102, and $C_1$ is the total output capacitance of the n first circuit units 101.

Thus, the impedance ratio can be expressed by:

$$\rho = \frac{Z_c}{Z_o} = \sqrt{\frac{\frac{L + M * t}{n * k^2}}{C_o + C_1 k^2}} / (V_{DD}/i_{max}) \qquad (30)$$

In addition, the first circuit units 101 are Buck-Boost or Boost circuits, and the n first circuit units 101 have the same topology, and the equivalent inductance of the power supply device is expressed as:

$$L_{eq} = \frac{L(1 - D) + M * t}{n * k^2} \qquad (31)$$

L is the inductance of the inductor in the first circuit unit 101. D is the duty cycle of the corresponding switch in the first circuit unit 101. M is the mutual inductance between the inductors of every two first circuit units 101. n is greater than or equal to 1. t is a constant.

When inductors are positively coupled with each other, M>0, t=1. When inductors are reversely coupled with each other, M<0, t=1. And when inductors are not coupled, t=0, M=0.

Thus, the impedance ratio can be expressed by:

$$\rho = \frac{Z_c}{Z_o} = \sqrt{\frac{\frac{L(1 - D) + M * t}{n * k^2}}{C_o + C_1 k^2}} / (V_{DD}/i_{max}) \qquad (32)$$

In addition, the first circuit unit is not limited to Buck circuit, Buck-Boost circuit, Boost circuit or other topologies, and the second circuit unit is not limited to LLC, LCC or other resonant circuits.

The impedance ratio ρ in the previous embodiment is generally fixed after the power supply device supplying power to the chip has been designed. In some embodiments, it can also be adjusted accordingly in real time when the power supply device is working. The Buck circuit will be described below as an example.

Figure 21:
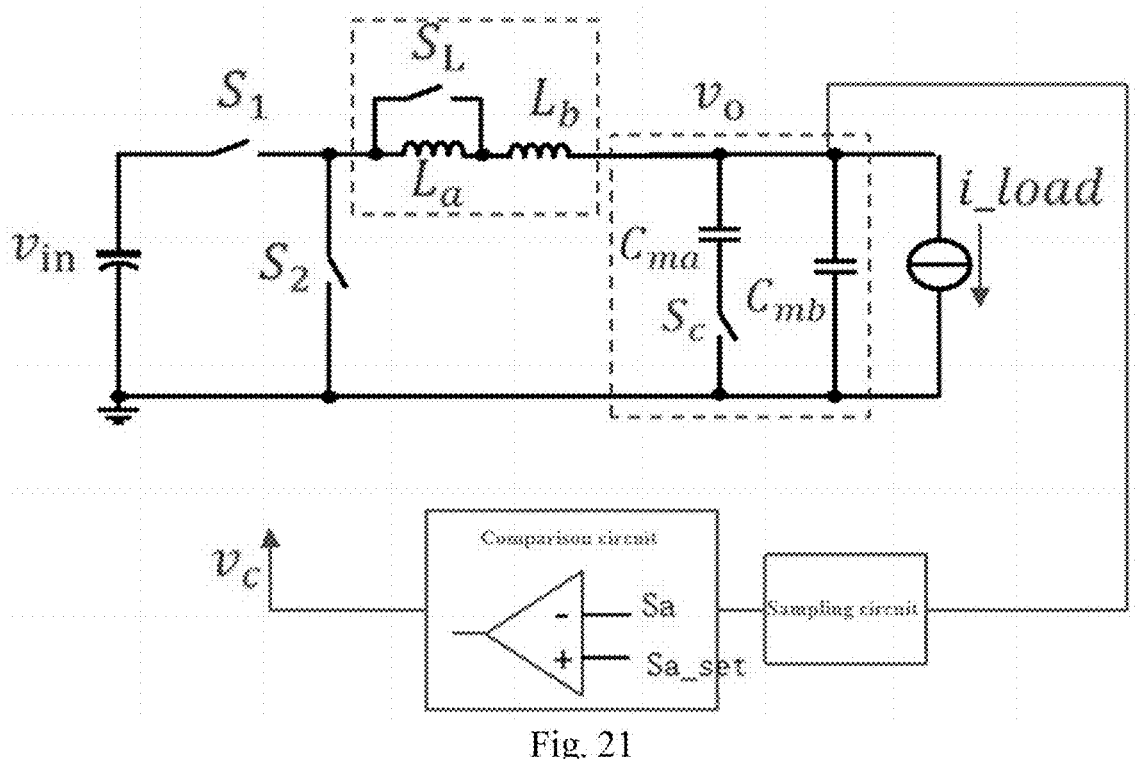
FIG. 21 shows the Buck circuit.

FIG. 21 shows the Buck circuit, which is different from the Buck circuit as shown in FIG. 2 in that the inductor $L_{eq}$ in FIG. 2 is replaced by a variable inductor unit in FIG. 21 (as shown in the dotted box at the left of FIG. 21). The capacitor $C_{m1}$, $C_{m2}$ in FIG. 2 is replaced by a variable capacitor unit in FIG. 21 (as shown in the dotted box on the right of FIG. 21). This variable inductor unit includes inductors $L_a$, $L_b$ and switch $S_L$. The switch $S_L$ and inductor $L_a$ are connected in parallel to form an inductor sub-unit, and then connected in series with the inductor $L_b$. The variable capacitor unit includes capacitors $C_{ma}$, $C_{mb}$, and switch $S_C$. The switch $S_C$ and capacitor $C_{ma}$ are connected in series to form a capacitor sub-unit, and then connected in parallel with the capacitor $C_{mb}$.

The control circuit of the Buck circuit includes at least one sampling circuit and one comparison circuit. The sampling circuit samples the signal Sa which reflects the impedance ratio ρ and send the signal Sa to the comparison circuit. After receiving the signal Sa, the comparison circuit compares the signal Sa with a reference signal $Sa_{set}$, and generates a control signal $v_c$ according to the corresponding comparison result to control the switch $S_1$ or $S_2$ of the circuit, so as to control the variable inductor unit or variable capacitor unit. For example, Sa_set corresponds to $\rho_{set}=1$. When $\rho>\rho_{set}$, the control signal $v_c$ controls the switch $S_L$ on, the variable inductor unit is changed from $L_a+L_b$ to $L_b$, thus ρ reduces with the reduction of the inductance. Alternatively the control signal $v_c$ controls the switch $S_c$ on, the variable capacitor unit is changed from $C_{mb}$ to $C_{ma}+C_{mb}$, ρ reduces with the increase of the capacitance.

Of course, the variable inductor unit can include multiple inductor sub-units. After the control signal $v_c$ controls the switch $S_L$ of one of the inductance sub-units on, if the signal Sa is still greater than the reference signal Sa_set, the switch $S_L$ of the other inductance sub-unit can continue to be on until the requirements are met. Similarly, the variable capacitor unit can include multiple capacitor sub-units. After the control signal $v_c$ controls the switch $S_c$ of one of the capacitor sub-units on, if the signal Sa is still greater than the reference signal Sa_set, the switch $S_c$ of the other capacitance sub-unit can continue to be on until the requirements are met. In a word, the control circuit can adjust dynamically the impedance ratio of the main circuit in real time, such as the Buck circuit, to meet the control purpose, such as to make the impedance ratio ρ<1.

For Boost circuit, Buck-Boost circuit and other circuits whose impedance ratio is related to the duty cycle of the circuit switching element mentioned above, the dynamic adjustment of the impedance ratio can also be realized by using the control signal $v_c$ to control the on time of the switches of the main circuit.

In order to realize the real-time adjustment of impedance ratio, the actual physical parameters of the main circuit components can be modified according to the control signal (such as the inductance or capacitance in the main circuit can be adjusted through on-off of some switches in the previous embodiment). The impedance ratio can also be adjusted in real-time by adjusting the virtual physical parameters of the components while without changing their actual physical parameters through certain control methods.

In a word, the control circuit can be adjusted dynamically in real time according to the current impedance ratio of the main circuit to meet the control purpose, such as to make the impedance ratio ρ<1.

In addition, the design of low impedance ratio of the circuit device or power supply module of the present invention (i.e. ρ<1) can greatly improve the dynamic performance compared with the design of high impedance ratio of the prior art (i.e. ρ>1), so as to achieve a great increase in peak performance. However, it may sacrifice a little bit the efficiency of the power supply device. In order to take into account the peak performance of the load and the efficiency of the power supply device, a two-stage power supply architecture can be considered to supply power to the load.

FIG. 19 shows a two-stage power supply architecture, wherein the input of the post stage circuit unit (i.e., the second circuit unit 102) receives the energy output by the pre-stage circuit unit (i.e., the first circuit unit 101), converts the energy and supplies it to the load. When the second circuit unit 102 is a regulated circuit and the ratio of its characteristic impedance to load impedance is less than 1, the equivalent inductance of the second circuit unit 102 may be small. Accordingly, the conduction loss of the second circuit unit 102 increases and its efficiency is low. In order to improve the efficiency of the second circuit unit 102, it can be considered to reduce the output voltage of the first circuit unit 101 (that is, the input voltage of the second circuit unit 102). In this way, under the same load, the reduction of the input voltage of the second circuit unit 102 will improve the efficiency of the second circuit unit 102.

Generally, when the voltage gain of the first circuit unit 101 (that is, the input voltage of the first circuit unit 101 over the output voltage of the first circuit unit 101) is greater than or equal to 8, the efficiency of the second circuit unit 102 will be greatly improved. Specifically, in the application of the data center, the input voltage range of the first circuit unit 101 is generally between 40V and 60V, and the output voltage of the second circuit unit 102 is between 0.3V and 2V. If the input voltage of the second circuit unit 102 is lower, the efficiency of the second circuit unit 102 is higher. When the voltage gain of the first circuit unit 101 is greater than or equal to 8, the output voltage of the first circuit unit 101 is below 7.5V, much lower than 12V in the prior art. In this way, the efficiency of the second circuit unit 102 will be greatly improved.

Therefore, the architecture in which the ratio of the characteristic impedance of the second circuit unit 102 to the load impedance is less than 1, and the voltage gain of the first circuit unit 101 is greater than or equal to 8, cannot only ensure that the high peak performance of the load, but also achieve high system efficiency.

It should be noted that, in this specification, terms "includes", "including", "has", "having", "comprises", "comprising", "contains", "containing" or any other variation thereof, are intended to cover a non-exclusive inclusion, such that a process, method, article, or apparatus, that includes, has, comprises, contains a list of elements does not include only those elements but may include other elements not expressly listed or inherent to such process, method, article, or apparatus. An element proceeded by "includes . . . a", "has . . . a", "comprises . . . a", "contains . . . a" does not, without more constraints, preclude the existence of additional identical elements in the process, method, article, or apparatus. In addition, it should be pointed out that the scope of the method and device in the embodiments of the present application is not limited to performing functions in the order shown or discussed, but can also include performing functions in a basically simultaneous manner or in the reverse order according to the functions involved. For example, the described method can be performed in a different order from the described one, and various steps can also be imposed, omitted, or combined. Moreover, features described with reference to some examples may be combined in other examples.

The embodiments of the present application are described above in combination with the drawings, but the present application is not limited to the above specific implementation modes. The above specific implementation modes are only schematic, not restrictive. Under the enlightenment of the present application, the ordinary skilled in the art can make many forms without departing from the scope protected by the purposes and claims of the present application, all of which fall within the protection of the present application.

What is claimed is:

1. A method for improving a peak performance of a processor, the method comprising:

S1, a maximum dynamic working voltage change of the processor is determined according to an impedance ratio of a characteristic impedance of a power supply device supplying power to the processor to a load impedance of the processor, and the impedance ratio is less than 1; the maximum dynamic working voltage change of processor is a maximum working voltage drop of the processor when a load rises and/or a maximum working voltage rise of the processor when the load falls;

S2, the peak working frequency of the processor is determined according to the maximum voltage jump of the processor; and S3, the peak performance of the processor is determined according to the peak working frequency of the processor;

wherein the power supply device comprises n first circuit units, n being a positive integer, each of the first circuit units comprises an inductor, when n is greater than or equal to 2, the n first circuit units are connected in parallel; and the equivalent inductance of the power supply device is related to the inductance of the inductor and n, and the output side equivalent capacitance is related to total output capacitance of the n first circuit units.

2. The method according to claim 1, the characteristic impedance is determined according to a ratio of an equivalent inductance of the power supply device to an output side equivalent capacitance; and the load impedance is determined according to a ratio of an output voltage of the power supply device to a maximum step current provided by the power supply device.

3. The method according to claim 2, the maximum working voltage drop of the processor is the working voltage drop of the processor when the load is switched from the lightest load to the heaviest load, and according to the impedance ratio, the maximum working voltage drop of the processor is satisfied:

$$v_{drop} = \frac{1}{2} \cdot \rho^2 \cdot \left(\frac{i_{upm}}{i_{max}}\right)^2 \cdot \frac{f_{sw}}{f_{max} - f_{sw}} \cdot V_{DD},$$

the maximum working voltage rise of the processor is the working voltage rise of the processor when the load is switched from the heaviest load to the lightest load, and according to the impedance ratio, the maximum working voltage rise of the processor is satisfied:

$$V_{rise} = \frac{1}{2} \cdot \rho^2 \left( \frac{i_{dom}}{i_{max}} \right)^2 \cdot V_{DD}$$

where, the impedance ratio is $$\rho = \frac{Z_c}{Z_o},$$

the characteristic impedance of the power supply device is $$Z_c = \sqrt{\frac{L_{eq}}{C_{eq}}},$$

the load impedance is $Z_o = v_o/i_{max}$, $L_{eq}$ is the equivalent inductance of the power supply device, $C_{eq}$ is the output side equivalent capacitance of the power supply device, $v_o$ is the output voltage of the power supply device, $i_{max}$ is the maximum step current provided by the power supply, $f_{sw}$ is the switching frequency of the power supply device, $f_{max}$ is the maximum frequency of the power supply device in the dynamic process, $i_{upm}$ is the step current when the load changes from the lightest to the heaviest, and $i_{dom}$ is the step current when the load changes from the heaviest to the lightest.

4. The method according to claim 2, wherein the step S2 further comprising:

a minimum working voltage is obtained according to a difference between a steady-state working voltage and the maximum working voltage drop of the processor;

a maximum working voltage is obtained according to a sum of the steady-state working voltage and the maximum working voltage rise of the processor; and the peak working frequency of the processor is a highest working frequency corresponding to the minimum working voltage within a voltage range from the minimum working voltage to the maximum working voltage.

5. The method according to claim 4, the peak working frequency of the processor is expressed as:

$$f_{cmax} = k \cdot (v - V_{min}) + f_{cb}$$

where, v is an instantaneous working voltage of the processor, $V_{min}$ is the minimum working voltage of the processor, k is a proportionality coefficient, and $f_{cb}$ is the maximum working frequency corresponding to the minimum working voltage of the processor.

6. The method according to claim 5, a calculation formula for determining the peak performance of the processor according to the peak working frequency of the processor is as blow, $$T_{max} = f_{cmax} \cdot N_{cuda} \cdot N_{ops} = [k \cdot (v - V_{min}) + f_{cb}] \cdot N_{cuda} \cdot N_{ops}$$

where, $T_{max}$ is the peak performance of the processor, $N_{cuda}$ is a number of cores, and $N_{ops}$ is a number of floating point operations that can be performed per clock cycle of each core.

7. The method according to claim 6, a calculation formula for determining thermal design power of the processor according to the peak working frequency of the processor is as blow, $$TDP = C_e \cdot N_{cuda} \cdot [k \cdot (v - V_{min}) + f_{cb}] \cdot V_{DD}^2 + V_{DD} \cdot I_{leak}$$

where, $C_e$ is the equivalent capacitance of single core of the processor, and $I_{leak}$ is a leakage current of the processor.

8. The method according to claim 1, the maximum dynamic working voltage change of the processor is a maximum working voltage drop of the processor e.

9. The method according to claim 8, further comprising: thermal design power of the processor is determined according to the peak working frequency and a steady-state working voltage of the processor.

10. The method according to claim 9, further comprising: if the thermal design power is not equal to a preset power threshold, the impedance ratio is correspondingly increased or decreased according to a comparison result, and step S1 is skipped to; and if the thermal design power is equal to the preset power threshold, step S3 is skipped to.

11. The method according to claim 9, further comprising: the thermal design power is compared with an initial power; if the thermal design power is not equal to the initial power, the steady-state working voltage is reduced and the step S1 is skipped to; and if the thermal design power is equal to the initial power, the step S3 is skipped to.

12. The method according to claim 1, wherein the maximum dynamic working voltage change of the processor refers to a maximum working voltage drop of the processor and a maximum working voltage rise of the processor.

13. The method according to claim 12, wherein step S2 further comprising:

the steady-state working voltage of the processor is determined according to the maximum working voltage rise of the processor; and the peak working frequency of the processor is determined according to the steady-state working voltage and the maximum working voltage drop of the processor.

14. A system for improving a peak performance of a processor, the system comprising:

a load, comprising a processor; and a power supply device, used for receiving an input voltage and generating an output voltage, and supplying power to the load, wherein the load has a load impedance, and the power supply device has a characteristic impedance, wherein the load impedance is defined by the output voltage of the power supply device and a maximum step current provided by the power supply device, the characteristic impedance is defined by an equivalent inductance of the power supply device and an output side equivalent capacitance, and the ratio of the characteristic impedance to the load impedance is less than 1.

15. The system according to claim 14, wherein the power supply device comprises n first circuit units, n being a positive integer, each of the first circuit units comprises an inductor, when n is greater than or equal to 2, the n first circuit units are connected in parallel; and the equivalent inductance of the power supply device is related to the inductance of the inductor and n, and the output side equivalent capacitance is related to total output capacitance of the n first circuit units.

16. The system according to claim 15, wherein the n first circuit units directly supply power to the load, and the output side equivalent capacitance is equal to the total output capacitance of the n first circuit units.

17. The system according to claim 16, wherein the first circuit units are Buck circuits, and the n first circuit units have the same topology, and the equivalent inductance of the power supply device is expressed as:

$$L_{eq} = \frac{L + M * t}{n}$$

where L is the inductance of the inductor, M is mutual inductance between the inductors of the first circuit units, n is greater than or equal to 1, and t is a constant; and where, when the inductors are positively coupled with each other, M>0, t=1; when the inductors are reversely coupled with each other, M<0, t=1; and when the inductors are not coupled, t=0.

18. The system according to claim 16, the first circuit units are Buck-Boost or Boost circuits, and the n first circuit units have the same topology, and the equivalent inductance of the power supply device is expressed as:

$$L_{eq} = \frac{L(1 - D) + M * t}{n}$$

where, L is the inductance of the inductor, M is mutual inductance between the inductors of the first circuit units, D is duty cycle of a switch in the first circuit unit, n is greater than or equal to 1, and t is a constant; and where, when the inductors are positively coupled with each other, M>0, t=1; when the inductors are reversely coupled with each other, M<0, t=1; and when the inductors are not coupled, t=0.

19. The system according to claim 15, wherein the power supply device further comprises m second circuit units, where m is a positive integer; when m is greater than or equal to 2, the m second circuit units are connected in parallel; an output port of the first circuit unit is electrically coupled to an input port of the second circuit unit, and an output port of the second circuit unit is electrically coupled to the load; and the output side equivalent capacitance is determined by total output capacitance of the n first circuit units and total output capacitance of the m second circuit units.

20. The system according to claim 19, wherein the second circuit units are non-regulated circuits, and a ratio of the input voltage to the output voltage of the second circuit unit is k; the output side equivalent capacitance is expressed as:

$$C_{eq} = C_o + C_1 k^2$$

where, $C_0$ is the total output capacitance of the m second circuit units, and $C_1$ is the total output capacitance of the n first circuit units.

21. The system according to claim 20, wherein the first circuit units are Buck circuits, and the n first circuit units have the same topology, and the equivalent inductance of the power supply device is equal to the inductance of the inductor, the equivalent inductance of the power supply device is expressed as:

$$L_{eq} = \frac{L + M * t}{n * k^2}$$

where, L is the inductance of the inductor, M is mutual inductance between the inductors of every two first circuit units, n is greater than or equal to 1, and t is a constant, and where, when inductors are positively coupled with each other, M>0, t=1; when inductors are reversely coupled with each other, M<0, t=1; and when inductors are not coupled, t=0.

22. The system according to claim 20, wherein the first circuit units are Buck-Boost or Boost circuits, and the n first circuit units have the same topology, and the equivalent inductance of the power supply device is expressed as:

$$L_{eq} = \frac{L(1 - D) + M * t}{n * k^2}$$

where, L is the inductance of the inductor, D is the duty cycle of a switch in the first circuit unit, M is the mutual inductance between the inductors of every two first circuit units, n is greater than or equal to 1, and t is a constant, and where, when inductors are positively coupled with each other, M>0, t=1; when inductors are reversely coupled with each other, M<0, t=1; and when inductors are not coupled, t=0.

23. The system according to claim 19, wherein the second circuit units are regulated circuits, the ratio of the characteristic impedance of the second circuit unit to the load impedance is less than 1, and voltage gain of the first circuit unit is greater than or equal to 8.

24. The system according to claim 14, wherein the ratio of the characteristic impedance to the load impedance is $$\rho = \frac{Z_c}{Z_o};$$

the characteristic impedance is $$Z_c = \sqrt{\frac{L_{eq}}{C_{eq}}};$$

the load impedance is $Z_o = v_o/i_{max}$; $L_{eq}$ is the equivalent inductance of the power supply device; $C_{eq}$ is the output side equivalent capacitance of the power supply device; $v_o$ is the output voltage of the power supply device; $i_{max}$ is the maximum step current provided by the power supply.

25. A system for improving a peak performance of a processor, the system comprising:

a load, comprising a processor; and a power supply device, used for receiving an input voltage and generating an output voltage, and supplying power to the load, wherein the power supply device has a characteristic impedance, and the characteristic imped- ance is defined by an equivalent inductance of the power supply device and an output side equivalent capacitance; the load has a load impedance, and the load impedance is defined by the output voltage of the power supply device and a maximum step current provided by the power supply device; the power supply device comprises a control circuit, and the control circuit is used for controlling the power supply device and adjusting the ratio of the characteristic impedance to the load impedance according to a comparison result of a reference value and a signal reflecting the ratio of the characteristic impedance to the load impedance.

26. The system according to claim 25, wherein the ratio is made to be less than 1 through adjusting the ratio of the characteristic impedance to the load impedance.

* * * * *